（12）United States Patent
Miura et al.

(10) Patent No.: US 10,355,269 B2
(45) Date of Patent: Jul. 16, 2019

(54) LITHIUM ION SECONDARY BATTERY HAVING POSITIVE ELECTRODE ACTIVE MATERIAL PARTICLE WITH FLUORINE AND PHOSPHOROUS CONTAINING FILM, AND METHOD OF MANUFACTURING THE SAME

(71) Applicant: TOYOTA JIDOSHA KABUSHIKI KAISHA, Toyota-shi, Aichi-ken (JP)

(72) Inventors: Takashi Miura, Toyota (JP); Masanori Kitayoshi, Toyota (JP); Nobuyuki Yamazaki, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 237 days.

(21) Appl. No.: 14/991,338

(22) Filed: Jan. 8, 2016

(65) Prior Publication Data

US 2016/0204426 A1      Jul. 14, 2016

(30) Foreign Application Priority Data

Jan. 14, 2015   (JP) .................................. 2015-004705
Apr. 17, 2015   (JP) .................................. 2015-084705

(51) Int. Cl.
*H01M 4/02*      (2006.01)
*H01M 4/36*      (2006.01)
(Continued)

(52) U.S. Cl.
CPC ........... *H01M 4/366* (2013.01); *H01M 4/131* (2013.01); *H01M 4/505* (2013.01); *H01M 4/525* (2013.01);
(Continued)

(58) Field of Classification Search
CPC ...... H01M 4/525; H01M 4/131; H01M 4/366; H01M 4/505; H01M 4/62; H01M 10/0525; H01M 10/058; H01M 10/446
(Continued)

(56) References Cited

U.S. PATENT DOCUMENTS 6,489,055 B1 * 12/2002 Ichihashi .......... H01M 10/0565
                                                            429/188
2010/0247986 A1    9/2010 Toyama et al.
(Continued)

FOREIGN PATENT DOCUMENTS

CN      102195027 A      9/2011
CN      102376948 A      3/2012
(Continued)

OTHER PUBLICATIONS

Kita, Akinori, Machine Translation of JP 2000-173663 A, Jun. 2000 (Year: 2000).*
(Continued)

*Primary Examiner* — Sean P Cullen
(74) *Attorney, Agent, or Firm* — Sughrue Mion, PLLC

(57) ABSTRACT

A lithium ion secondary battery includes: a positive electrode sheet that includes a positive electrode active material layer containing a positive electrode active material particle; a negative electrode sheet; and a nonaqueous electrolytic solution that contains a compound containing fluorine, wherein a surface of the positive electrode active material particle includes a film containing fluorine and phosphorus, and a ratio Cf/Cp satisfies $1.89 \leq Cf/Cp \leq 2.61$ where Cf represents the number of fluorine atoms in the film, and Cp represents the number of phosphorus atoms in the film.

9 Claims, 10 Drawing Sheets

(51) Int. Cl.
- *H01M 4/62* (2006.01)
- *H01M 10/44* (2006.01)
- *H01M 4/131* (2010.01)
- *H01M 4/505* (2010.01)
- *H01M 4/525* (2010.01)
- *H01M 10/058* (2010.01)
- *H01M 10/0525* (2010.01)
- *H01M 10/0567* (2010.01)

(52) U.S. Cl.
CPC ........... *H01M 4/62* (2013.01); *H01M 10/058* (2013.01); *H01M 10/0525* (2013.01); *H01M 10/0567* (2013.01); *H01M 10/446* (2013.01); *H01M 2004/021* (2013.01); *H01M 2004/028* (2013.01); *H01M 2300/0025* (2013.01); *Y02T 10/7011* (2013.01)

(58) Field of Classification Search
USPC .......................................... 429/199; 29/623.1
See application file for complete search history.

(56) References Cited

U.S. PATENT DOCUMENTS

| | | | |
|---|---|---|---|
| 2011/0217574 A1 | 9/2011 | Toyama et al. | |
| 2012/0034503 A1 | 2/2012 | Toyama et al. | |
| 2013/0122370 A1* | 5/2013 | Rho | H01M 4/5825 429/220 |
| 2014/0162127 A1* | 6/2014 | Kim | H01M 4/366 429/224 |
| 2015/0050552 A1* | 2/2015 | Matsuyama | H01M 4/505 429/199 |
| 2015/0372343 A1 | 12/2015 | Mitsuhashi | |

FOREIGN PATENT DOCUMENTS

| | | | |
|---|---|---|---|
| EP | 2237348 A1 | | 10/2010 |
| EP | 2741353 A1 | | 6/2014 |
| JP | 2000173663 A | * | 6/2000 |
| JP | 2010118179 A | | 5/2010 |
| JP | 2010-232001 A | | 10/2010 |
| JP | 2011187193 A | | 9/2011 |
| JP | 2012-181975 A | | 9/2012 |
| JP | 2014130782 A | | 7/2014 |
| JP | 2014150027 A | | 8/2014 |
| JP | 2016115654 A | | 6/2016 |

OTHER PUBLICATIONS

Nicholas P.W. Pieczonka et al., "Understanding Transition-Metal Dissolution Behavior in $LiNi_{0.5}Mn_{1.5}O_4$, High-Voltage Spinel for Lithium Ion Batteries," The Journal of Physical Chemistry (2013) vol. 117, pp. 15947-15957.

U.S. Appl. No. 14/885,062, filed Oct. 16, 2015; Inventors: (1) Nobuyuki Yamazaki, (2) Masanori Kitayoshi, (3) Takashi Miura.

Amine, K et al: "Factors responsible for impedance rise in high power lithium ion batteries", Journal of Power Sources, Elsevier SA, CH, vol. 97-98, Jan. 7, 2001, pp. 684-687 (4 pages total).

* cited by examiner

LITHIUM ION SECONDARY BATTERY HAVING POSITIVE ELECTRODE ACTIVE MATERIAL PARTICLE WITH FLUORINE AND PHOSPHOROUS CONTAINING FILM, AND METHOD OF MANUFACTURING THE SAME

INCORPORATION BY REFERENCE

The disclosure of Japanese Patent Application Nos. 2015-004705 and 2015-084705 filed on Jan. 14, 2015 and Apr. 17, 2015 including the specification, drawings and abstract is incorporated herein by reference in its entirety.

BACKGROUND OF THE INVENTION

1. Field of the Invention

The present invention relates to a lithium ion secondary battery and a method of manufacturing the same, the lithium ion secondary battery including: a positive electrode sheet that includes a positive electrode active material layer containing positive electrode active material particles; a negative electrode sheet; and a nonaqueous electrolytic solution that contains a compound containing fluorine.

2. Description of Related Art

It is known that, in a lithium ion secondary battery (hereinafter, referred to simply as "battery"), the voltage is high during charging; therefore, a nonaqueous solvent of a nonaqueous electrolytic solution is likely to be oxidized and decomposed on particle surfaces of positive electrode active material particles. When the nonaqueous electrolytic solution contains a compound containing fluorine, hydrogen ions, which are produced by the oxidation decomposition of the nonaqueous solvent, may react with fluorine to produce hydrofluoric acid (HF). As a result, due to the action of the hydrofluoric acid, transition metal is eluted from the positive electrode active material particles, and the battery capacity decreases. Therefore, this battery has a problem in that the battery capacity significantly decreases in a charging-discharging cycle test.

As a countermeasure against the problem, a technique of forming a film containing fluorine on particle surfaces of positive electrode active material particles is known. By covering the particle surfaces of the positive electrode active material particles with the film, direct contact between the nonaqueous electrolytic solution and the positive electrode active material can be suppressed. Therefore, the oxidation decomposition of the nonaqueous solvent of the nonaqueous electrolytic solution during charging or the like can be suppressed. In particular, fluorine is not likely to be oxidized, and the film containing fluorine is strong. Therefore, the oxidation decomposition of the nonaqueous solvent can be efficiently suppressed. Accordingly, when the charging-discharging cycle test is performed on the battery, a decrease in battery capacity can be suppressed. For example, Japanese Patent Application Publication No. 2012-181975 (JP 2012-181975 A) discloses a battery including a film containing fluorine that is formed on particle surfaces of positive electrode active material particles of a lithium nickel manganese composite oxide which contains at least nickel and manganese as transition metal (refer to claims in JP 2012-181975 A).

However, since the film containing fluorine is a resistor, the battery resistance is likely to increase due to the film.

SUMMARY OF THE INVENTION

The invention provides a lithium ion secondary battery and a method of manufacturing the same, in which a decrease in battery capacity caused by a charging-discharging cycle test can be appropriately suppressed, and the battery resistance can be appropriately reduced.

A first aspect of the invention provides a lithium ion secondary battery including: a positive electrode sheet that includes a positive electrode active material layer containing a positive electrode active material particle; a negative electrode sheet; and a nonaqueous electrolytic solution that contains a compound containing fluorine. A surface of the positive electrode active material particle includes a film containing fluorine and phosphorus. A ratio Cf/Cp satisfies $1.89 \leq Cf/Cp \leq 2.61$ where Cf represents the number of fluorine atoms in the film, and Cp represents the number of phosphorus atoms in the film.

In the above-described aspect, the film provided on the particle surfaces of the positive electrode active material particles contains not only fluorine (F) but also phosphorus (P). It was found that the battery resistance can be reduced by adding phosphorus to the film to reduce the resistance of the film. However, it was found that, when the ratio of the number of phosphorus atoms Cp to the number of fluorine atoms in the film is excessively high, the battery capacity significantly decreases in a charging-discharging cycle test. In the film according to the above-described aspect, the ratio Cf/Cp of the number of fluorine atoms Cf to the number of phosphorus atoms Cp satisfies $1.89 \leq Cf/Cp \leq 2.61$. A decrease in battery capacity caused by the charging-discharging cycle test can be appropriately suppressed by adjusting the ratio Cf/Cp to satisfy $Cf/Cp \geq 1.89$. On the other hand, the battery resistance can be appropriately reduced by adjusting Cf/Cp to satisfy $Cf/Cp \leq 2.61$. Accordingly, in the above-described aspect, the battery resistance can be appropriately reduced while appropriately suppressing a decrease in battery capacity caused by the charging-discharging cycle test.

In addition to fluorine and phosphorus, "the film containing fluorine and phosphorus" may contain decomposition products of other components (for example, an electrolyte, a nonaqueous solvent, and an additive) of the nonaqueous electrolytic solution. As the positive electrode active material which form "positive electrode active material particles", for example, a lithium transition metal composite oxide may be used. Examples of the lithium transition metal composite oxide include lithium nickel cobalt manganese composite oxide containing nickel (Ni), cobalt (Co), and manganese (Mn) as transition metal, lithium nickel manganese composite oxide containing nickel and manganese as transition metal, lithium nickel oxide ($LiNiO_2$), lithium cobalt oxide ($LiCoO_2$), and lithium manganese oxide ($LiMn_2O_4$).

In addition to the positive electrode active material particles, "the positive electrode active material layer" may contain: a conductive material such as graphite or carbon black; and a binder such as polyvinylidene fluoride (PVDF), polytetrafluoroethylene (PTFE), or styrene-butadiene rubber (SBR). "The negative electrode sheet" may include a negative electrode active material layer containing negative electrode active material particles. Examples of the negative electrode active material particle include particles which are formed of a carbon material, such as graphite, capable of intercalating and deintercalating lithium.

"The nonaqueous electrolytic solution" is obtained by dissolving an electrolyte in a nonaqueous solvent but may contain other additives. "The compound containing fluorine" contained in the nonaqueous electrolytic solution may be an electrolyte containing fluorine (for example, $LiPF_6$ described below) or an additive containing fluorine (for example, LiF described below). Among the compound containing fluorine, one kind may be used alone, or a combination of two or more kinds may be used.

Examples of the nonaqueous solvent include organic solvents such as dimethyl carbonate, diethyl carbonate, ethyl methyl carbonate, methyl propyl carbonate, ethylene carbonate, propylene carbonate, butylene carbonate, and vinylene carbonate. Among these, one kind may be used, or a mixture of two or more kinds may be used. Examples of the electrolyte include $LiPF_6$, $LiBF_4$, $LiAsF_6$, $LiSbF_6$, and $LiCF_3SO_3$. Among these, one kind may be used, or a combination of two or more kinds may be used.

Examples of other additives include a fluoride, a phosphorus compound, and lithium bis(oxalato)borate (LiBOB). Examples of the fluoride include AgF, $CoF_2$, $CoF_3$, CuF, $CuF_2$, $FeF_2$, $FeF_3$, LiF, $MnF_2$, $MnF_3$, $SnF_2$, $SnF_4$, $TiF_3$, $TiF_4$, and $ZrF_4$. Among these, one kind may be used, or a combination of two or more kinds may be used.

Examples of the phosphorus compound include $LiPO_3$ and $Li_3PO_4$. Among these, one kind may be used, or a combination of two or more kinds may be used.

In the first aspect, a thickness α of the film may satisfy 10 nm≤α≤15 nm.

When the thickness α of the film containing fluorine and phosphorus is excessively small, specifically, less than 10 nm, the battery capacity decreases in the charging-discharging cycle test. The reason for this is presumed to be as follows. When the film thickness α is excessively small, the oxidation decomposition of the nonaqueous solvent of the nonaqueous electrolytic solution on the particle surfaces of the positive electrode active material particles is easy to progress, and the elution of transition metal from the positive electrode active material particles is easy to progress. On the other hand, it was found that, when the film thickness α is excessively large, specifically, more than 15 nm, the battery resistance increases. The reason for this is presumed to be as follows. The film is a resistor although it contains phosphorus. Therefore, when the thickness α is excessively large, the battery resistance increases. On the other hand, in the above-described aspect, the film thickness α (nm) satisfies 10≤α≤15. Therefore, a decrease in battery capacity caused by the charging-discharging cycle test can be more efficiently suppressed, and the battery resistance can be more efficiently reduced.

In the first aspect, the film may include: an outer portion provided outside a center in a thickness direction of the film; and an inner portion provided inside the center in the thickness direction of the film, and a value of Cf1/Cp1 may be larger than a value of Cf2/Cp2. Cf1 represents the number of fluorine atoms in the inner portion, Cp1 represents the number of phosphorus atoms in the inner portion, Cf2 represents the number of fluorine atoms in the outer portion, and Cp2 represents the number of phosphorus atom in the outer portion.

In the above-described aspect, the value of Cf1/Cp1 in the inner portion is larger than the value of Cf2/Cp2 in the outer portion. As a result, a decrease in battery capacity caused by the charging-discharging cycle test can be further suppressed as compared to a film in which the ratio of the number of fluorine atoms to the number of phosphorus atoms is constant in the thickness direction.

In the first aspect, the positive electrode active material particle may be formed of a lithium transition metal composite oxide, and a ratio Da/Db may satisfy 1.1≤Da/Db≤1.2. Da represents an amount of lithium in the lithium transition metal composite oxide, and Db represents an amount of a transition metal composite oxide portion excluding lithium in the lithium transition metal composite oxide.

Fluorine has strong oxidizability even at a normal temperature and reacts with lithium of the positive electrode active material (lithium transition metal composite oxide) to form lithium fluoride (LiF). Therefore, when the film containing fluorine is formed on the particle surfaces of the positive electrode active material particles, the number of lithium atoms capable of contributing to a cell reaction is reduced, and thus the initial battery capacity decreases. On the other hand, in the above-described aspect, the positive electrode active material particles are used in which the ratio Da/Db of the amount Da of lithium to the amount Db of a transition metal composite oxide portion in the lithium transition metal composite oxide satisfies 1.1≤Da/Db≤1.2.

A decrease in initial battery capacity can be suppressed by adjusting Da/Db to satisfy Da/Db≥1.1. The reason for this is presumed to be as follows. A large amount of lithium is present in the positive electrode active material particles used. Therefore, although lithium fluoride is produced, a decrease in battery capacity can be suppressed. The battery resistance can be appropriately reduced by adjusting Da/Db to satisfy 1.1≤Da/Db≤1.2. The reason for this is presumed to be as follows. When Da/Db<1.1, the amount of lithium is excessively small, and lithium is excessively extracted from the positive electrode active material particles, which increases the battery resistance. On the other hand, when Da/Db>1.2, the amount of lithium is excessively large, and crystals of the positive electrode active material particles are strained, which increases the battery resistance. Accordingly, in the battery, a decrease in initial battery capacity can be appropriately suppressed, and the battery resistance can be appropriately reduced.

In the first aspect, the positive electrode active material particle may be formed of a lithium nickel manganese composite oxide having a spinel-type crystal structure, and an amount β of Mn—F on the surface measured by time of flight secondary ion mass spectrometer (TOF-SIMS) may satisfy 8.2≤β≤38.7.

It was found that, when the amount β of Mn—F on the particle surfaces of the positive electrode active material particles is excessively small, specifically, less than 8.2, the battery resistance increases. The reason for this is presumed to be as follows. When β<8.2, the battery resistance increases because a desolvation effect of lithium ions obtained by a Mn—F bond is low. When β≥8.2, the battery resistance decreases because the desolvation of lithium ions is promoted. On the other hand, it was found that, when the amount β of Mn—F on the particle surfaces is excessively large, specifically, more than 8.7, the battery resistance increases. The reason for this is presumed to be as follows. When β>8.7, crystals of the positive electrode active material particles are strained.

It was found that, at least within a range of 8.2≤β≤8.7, a decrease in battery capacity caused by the charging-discharging cycle test is substantially constant with the value of β and can be appropriately suppressed. In the above-described lithium ion secondary battery, the amount β of Mn—F on the particle surfaces of the positive electrode active material particles satisfies 8.2≤β≤8.7. Therefore, the battery resistance can be appropriately reduced, and a decrease in battery capacity caused by the charging-discharging cycle test can be appropriately suppressed.

The lithium nickel manganese composite oxide having a spinel-type crystal structure (hereinafter, also referred to simply as "lithium nickel manganese composite oxide having a spinel structure") is represented by the following formula (1).

$$LiNi_xM_yMn_{2-x-y}O_4 \qquad (1)$$

In the formula (1), x satisfies x>0 and preferably 0.2≤x≤1.0. y satisfies y≥0 and preferably 0≤x<1.0. x+y<2.0 is satisfied. "M" may be an arbitrary transition metal element other than Ni and Mn, or a typical metal element (for example, one element or two or more elements selected from Fe, Co, Cu, Cr, Zn, and Al). Alternatively, M may be a metalloid element (for example, one element or two or more elements selected from B, Si, and Ge) or a non-metal element. Whether or not the positive electrode active material particles have a spinel structure can be determined using, for example, X-ray structure analysis (preferably, single crystal X-ray structure analysis). Specifically, the determination can be made using X-ray diffraction measurement in which CuKα rays are used.

A second aspect of the invention provides a method of manufacturing a lithium ion secondary battery comprising: forming of a first film on a surface of a positive electrode active material particle, the first film containing fluorine; forming of a positive electrode sheet by using the positive electrode active material particle and a phosphorus compound after the forming of the first film, the positive electrode sheet including a positive electrode active material layer; constructing of a battery by using the positive electrode sheet, a negative electrode sheet, and a nonaqueous electrolytic solution after the forming of the positive electrode sheet, the nonaqueous electrolytic solution containing a compound containing fluorine; and initial charging of the battery to form a second film containing phosphorus on the first film after the construction, the first film and the second film forming a film in which a ratio Cf/Cp satisfies 1.89≤Cf/Cp≤2.61, where Cf represents the number of fluorine atoms in the film, and Cp represents the number of phosphorus atoms in the film.

According to the second aspect, first, a first film containing fluorine is formed on particle surfaces of positive electrode active material particles (first film forming step). The first film is formed, for example, by exposing the positive electrode active material particles to an atmosphere containing fluorine gas or nitrogen trifluoride (NF$_3$) gas. Alternatively, the first film may be formed by dipping the positive electrode active material particles in a solvent containing a fluoride. Next, the positive electrode sheet is formed using the positive electrode active material particles including the first film and the phosphorus compound (positive electrode sheet forming step). Further, the battery is constructed (construction step) and is initially charged (initial charging step). In the initial charging step, the phosphorus compound in the positive electrode active material layer is decomposed, and the second films containing phosphorus is formed on the first film. As a result, the film containing fluorine and phosphorus and satisfying 1.89≤Cf/Cp≤2.61 can be easily formed.

In the second aspect, the first film containing fluorine is formed, and then the second film containing phosphorus is formed. Therefore, in the film including the first film and the second film, the value of the ratio Cf1/Cp1 is larger than Cf2/Cp2, where Cf1 represents the number of fluorine atoms in the inner portion, Cp1 represents the number of phosphorus atoms in the inner portion, Cf2 represents the number of fluorine atoms in the outer portion, and Cp2 represents the number of phosphorus atom in the outer portion. The inner portion is provided inside the center in the thickness direction, and the outer portion is provided outside the center in the thickness direction. As a result, in the manufactured battery, a decrease in battery capacity caused by the charging-discharging cycle test can be further suppressed as compared to a film in which the ratio of the number of fluorine atoms to the number of phosphorus atoms is constant in the thickness direction. As described above, examples of "the phosphorus compound" include LiPO$_3$ and Li$_3$PO$_4$. Among these, one kind may be used, or a combination of two or more kinds may be used.

In the second aspect, the forming of the first film may include exposing the positive electrode active material particle to an atmosphere containing at least one of fluorine gas and nitrogen trifluoride gas to form the first film.

In the above-described aspect, the first film is formed by exposing the positive electrode active material particles to an atmosphere containing at least one of fluorine gas and nitrogen trifluoride gas. As a result, the first film containing fluorine can be easily formed.

In the second aspect, the positive electrode active material particle may be formed of a lithium transition metal composite oxide, and a ratio Da/Db satisfies 1.1≤Da/Db≤1.2 where Da represents an amount of lithium in the lithium transition metal composite oxide, and Db represents an amount of a transition metal composite oxide portion excluding lithium in the lithium transition metal composite oxide.

In the above-described aspect, the battery is manufactured by using, in the first film forming step, the positive electrode active material particles in which the ratio Da/Db of the amount Da of lithium to the amount Db of a transition metal composite oxide portion satisfies 1.1≤Da/Db≤1.2. As described above, a decrease in initial battery capacity can be suppressed by adjusting Da/Db to satisfy Da/Db≥1.1. As described above, the battery resistance can be appropriately reduced by adjusting Da/Db to satisfy 1.1≤Da/Db≤1.2. Accordingly, in the manufactured battery, a decrease in initial battery capacity can be appropriately suppressed, and the battery resistance can be appropriately reduced.

In the second aspect, the forming of the first film may include bonding manganese in the positive electrode active material particle and fluorine such that an amount β of Mn—F on the surface satisfies 8.2≤β≤8.7. The amount β may be measured by TOF-SIMS.

As described above, the battery resistance can be appropriately reduced by adjusting the amount β of Mn—F on the particle surfaces of the positive electrode active material particles to satisfy 8.2≤β≤8.7. On the other hand, at least within a range of 8.2≤β≤8.7, a decrease in battery capacity caused by the charging-discharging cycle test is substantially constant and can be appropriately suppressed. Therefore, according to the above-described manufacturing method, in the manufactured battery, the battery resistance can be appropriately reduced, and a decrease in battery capacity caused by the charging-discharging cycle test can be appropriately suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
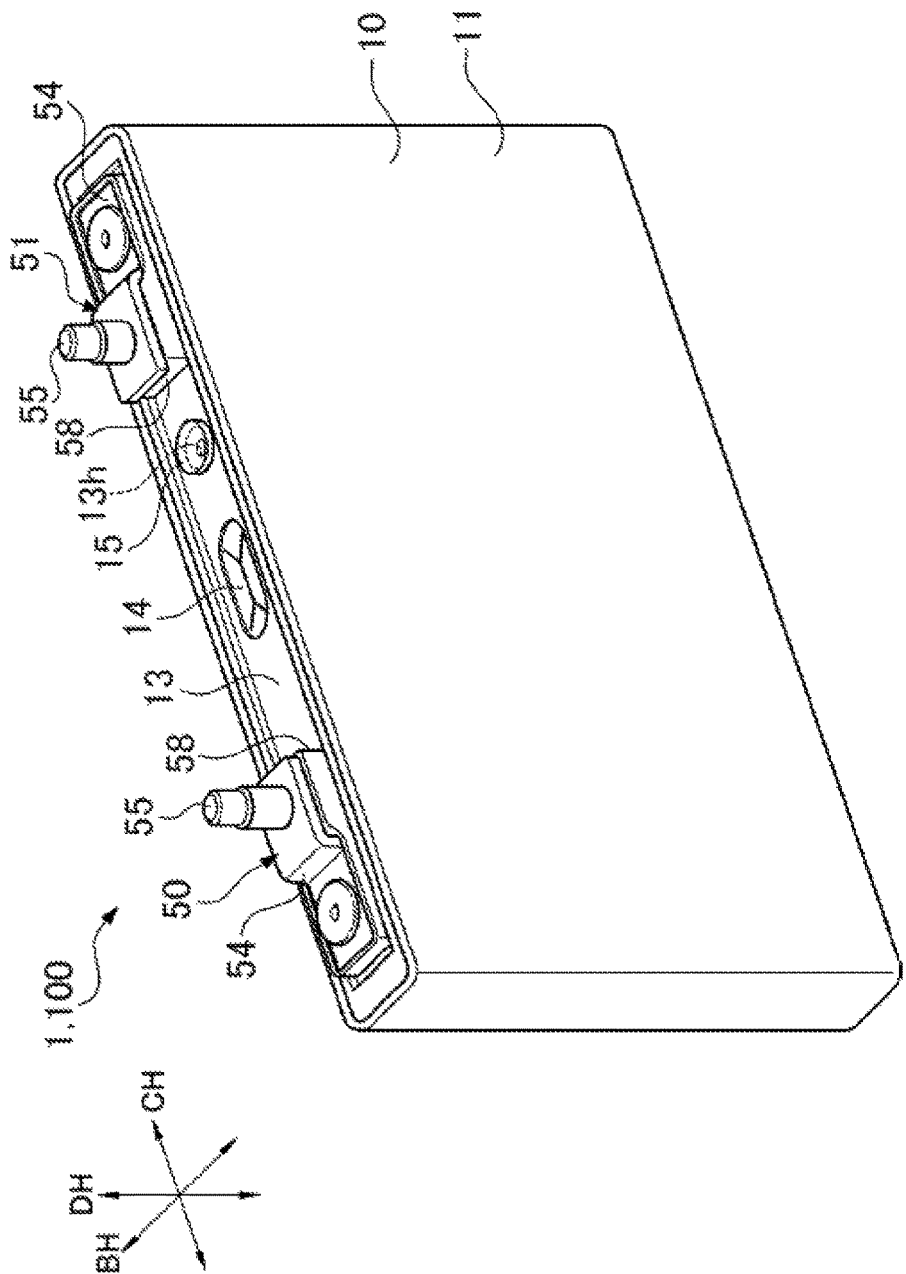
FIG. 1 is a perspective view showing a lithium ion secondary battery according to Embodiment 1 and 2.
Figure 2:
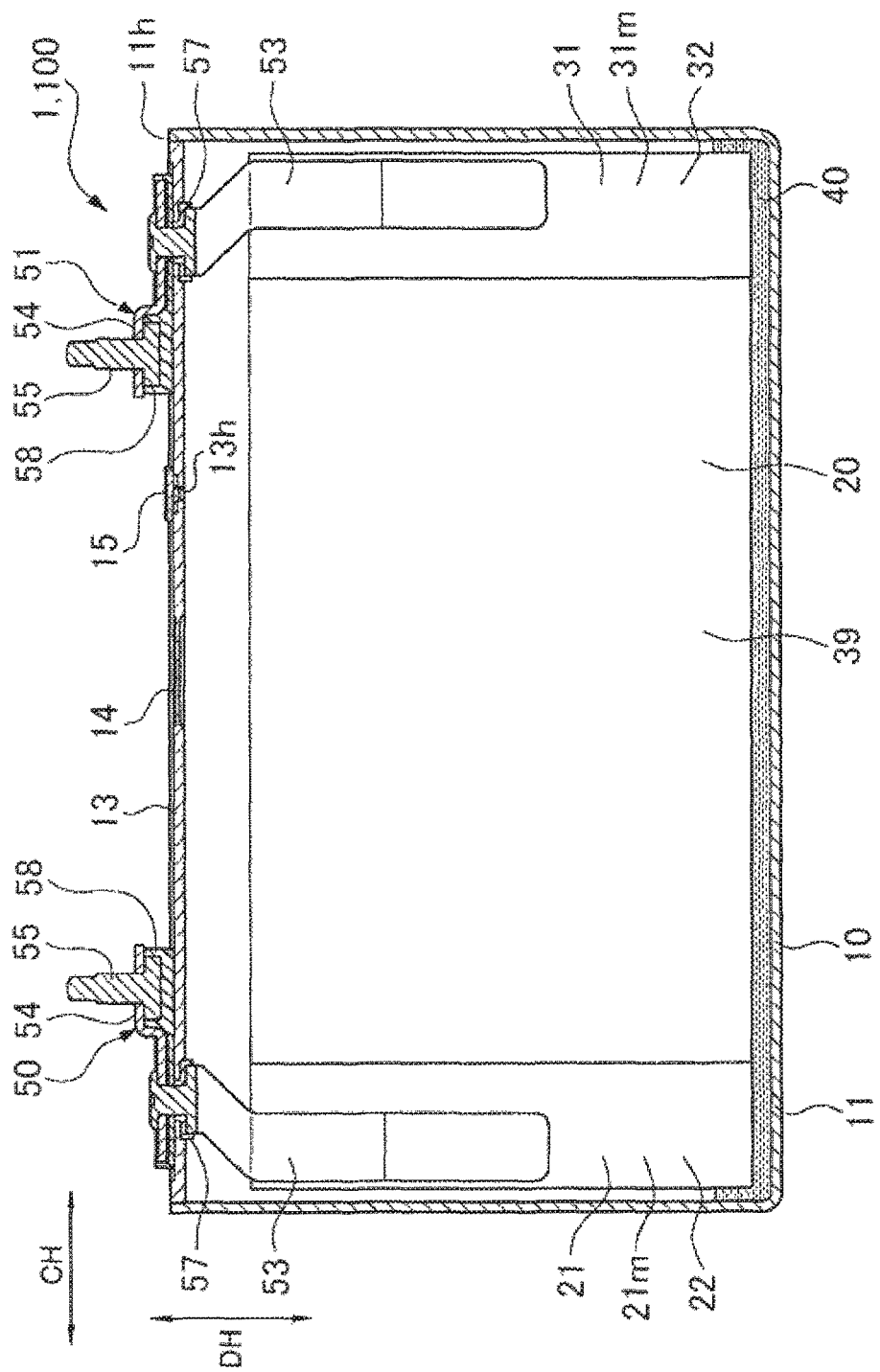
FIG. 2 is a longitudinal sectional view showing the lithium ion secondary battery according to Embodiment 1 and 2 when being cut in a plan view along a horizontal direction and a vertical direction of the battery.
Figure 3:
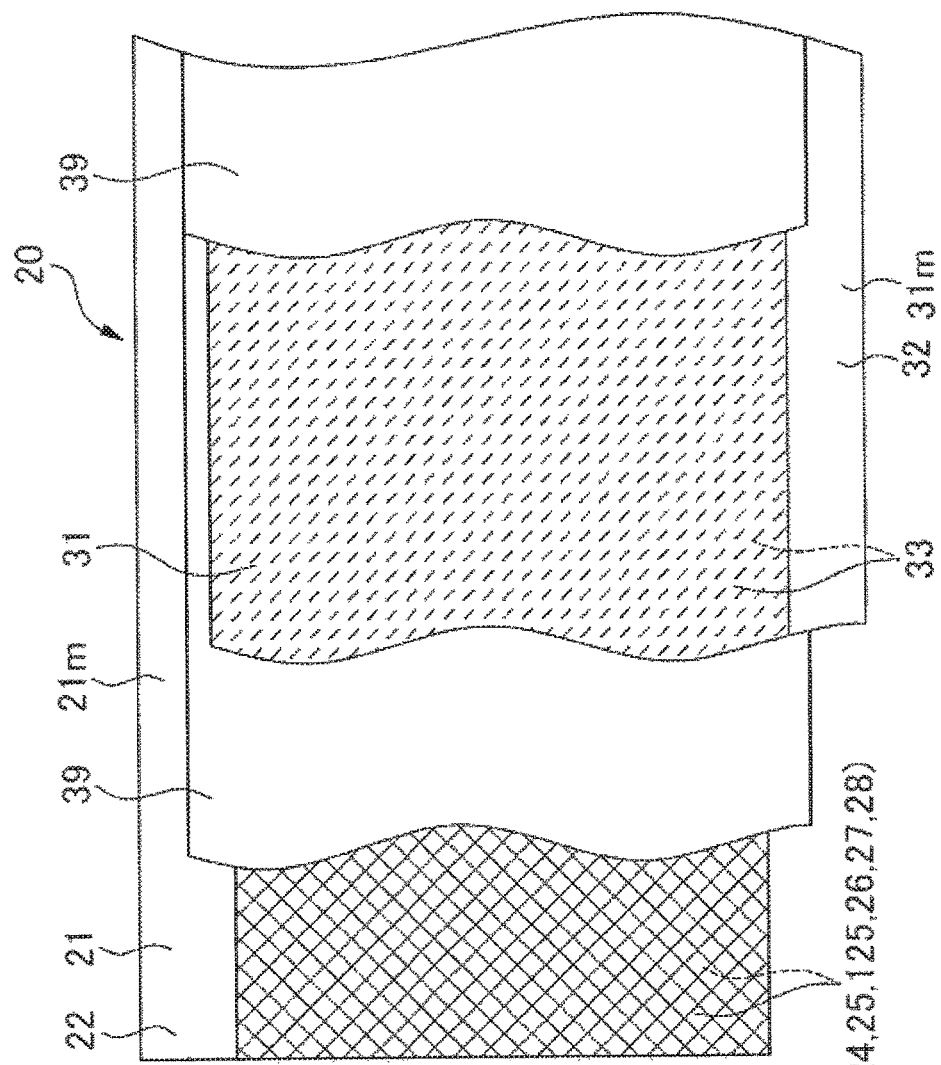
FIG. 3 is an exploded view of an electrode body showing a state where a positive electrode sheet and a negative electrode sheet are laminated with separators interposed therebetween in Embodiments 1, 2.
Figure 4:
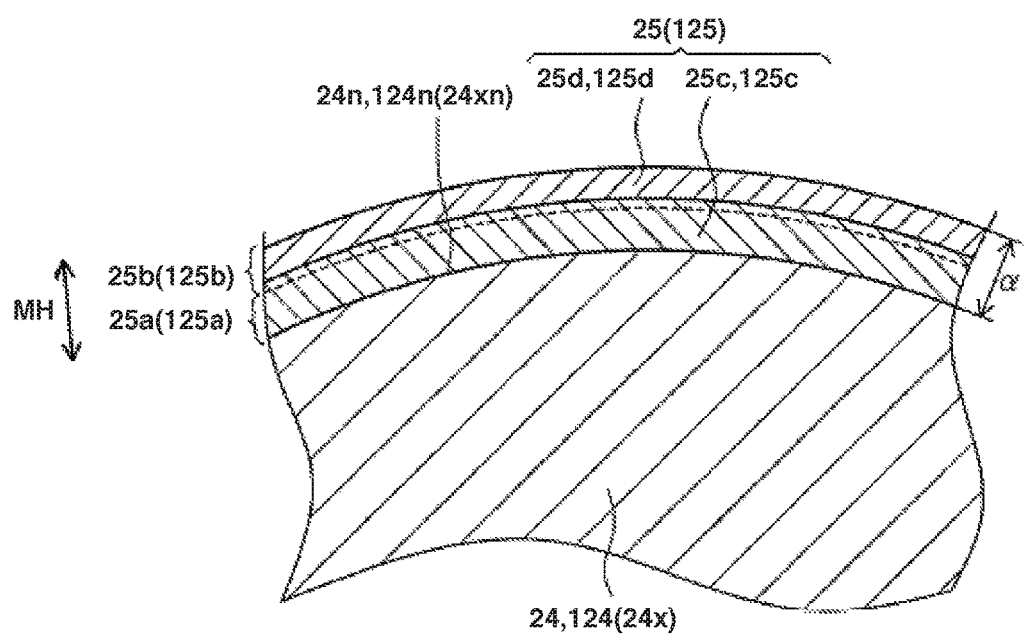
FIG. 4 is a diagram schematically showing the vicinity of a particle surface in a section of a positive electrode active material particle in Embodiments 1, 2.

Hereinafter, embodiments of the invention will be described with reference to the drawings. FIGS. 1 and 2 show a lithium ion secondary battery 1 (hereinafter, also referred to simply as "battery 1") according to Embodiment 1. FIG. 3 is an exploded view of an electrode body 20 constituting the battery 1. FIG. 4 schematically shows the vicinity of a particle surface 24n in a section of a positive electrode active material particle 24. In FIGS. 1 and 2, a thickness direction of the battery 1 is represented by BH, a horizontal direction of the battery 1 is represented by CH, and a vertical direction of the battery 1 is represented by DH. This battery 1 is a square closed lithium ion secondary battery which is mounted on a vehicle such as a hybrid vehicle or an electric vehicle. The battery 1 includes: a battery case 10; the electrode body 20 and a nonaqueous electrolytic solution 40 that are accommodated in the battery case 10; and a positive electrode terminal 50 and a negative electrode terminal 51 that are supported on the battery case 10.

The battery case 10 has a cuboid shape and is formed of metal (in Embodiment 1, aluminum). This battery case 10 includes: a cuboid box-shaped case body 11 having an opening 11h only at an upper end; and a rectangular plate-shaped case lid 13 that is welded to the case body 11 such that the opening 11h is closed. In the case lid 13, a safety valve 14 is provided so as to be released when the internal pressure of the battery case 10 reaches a predetermined value. In the case lid 13, a liquid injection hole 13h, which connects the inside and outside of the battery case 10, is formed and is air-tightly sealed with a sealing member 15.

Each of the positive electrode terminal 50 and the negative electrode terminal 51 includes an internal terminal member 53, an external terminal member 54, and a bolt 55 and is fixed to the case lid 13 through an internal insulating member 57 and an external insulating member 58 which are formed of a resin. The positive electrode terminal 50 is formed of aluminum, and the negative electrode terminal 51 is formed of copper. In the battery case 10, the positive electrode terminal 50 is electrically connected to a positive electrode current collector portion 21m of the positive electrode sheet 21 in the electrode body 20 described below. The negative electrode terminal 51 is electrically connected to a negative electrode current collector portion 31m of the negative electrode sheet 31 in the electrode body 20.

Next, the electrode body 20 will be described (refer to FIGS. 2 and 3). The electrode body 20 has a flat shape and is accommodated in the battery case 10. The electrode body 20 is obtained by laminating the belt-shaped positive electrode sheet 21 and the belt-shaped negative electrode sheet 31 with a pair of belt-shaped separators 39 to obtain a laminate, winding the laminate to obtain a wound body, and pressing the wound body into a flat shape.

In the positive electrode sheet 21, a positive electrode active material layer 23 having a belt shape is provided in a region in a width direction, on both main surfaces of a positive electrode current collector foil 22 which is a belt-shaped aluminum foil, the region extending along a longitudinal direction. The positive electrode active material layer 23 contains positive electrode active material particles 24, a conductive material 26, a binder 27, and a phosphorus compound 28 described below. In Embodiment 1, acetylene black (AB) is used as the conductive material 26, polyvinylidene fluoride (PVDF) is used as the binder 27, and lithium phosphate ($Li_3PO_4$) is used as the phosphorus compound 28. In one end portion of the positive electrode current collector foil 22 in the width direction, the positive electrode current collector portion 21m is provided in which the positive electrode current collector foil 22 is exposed without the positive electrode active material layer 23 being present in the thickness direction. The positive electrode terminal 50 is welded to the positive electrode current collector portion 21m.

In Embodiment 1, the positive electrode active material particles 24 are formed of a lithium transition metal composite oxide, specifically, $LiNi_{0.5}Mn_{1.5}O_4$ which is a lithium nickel manganese composite oxide having a spinel-type crystal structure. The battery 1 of Embodiment 1 is manufactured using the positive electrode active material particles 24x in which the ratio Da/Db of the amount Da of lithium (Li) to the amount Db of a transition metal composite oxide portion ($Ni_{0.5}Mn_{1.5}O_4$) excluding lithium in the compound ($LiNi_{0.5}Mn_{1.5}O_4$) satisfies $1.1 \leq Da/Db \leq 1.2$. In Embodiment 1, Da/Db=1.1.

A film 25 containing fluorine and phosphorus is formed on the particle surface 24n of each of the positive electrode active material particles 24 (refer to FIG. 4). In addition to fluorine and phosphorus, the film 25 contains decomposition products of other components (an electrolyte and a nonaqueous solvent) of the nonaqueous electrolytic solution 40. In the film 25, a ratio Cf/Cp of the number of fluorine atoms Cf to the number of phosphorus atoms Cp satisfies $1.89 \leq Cf/Cp \leq 2.61$. In Embodiment 1, Cf/Cp=2.23.

As described below, in the film 25, the ratio Cf/Cp is higher in an inner portion 25a than in an outer portion 25b, the inner portion 25a being provided inside the center (indicated by broken line in FIG. 4) in a thickness direction MH of the film 25, and the outer portion 25b being provided outside the center in the thickness direction MH (refer to Example 2 in FIG. 7). A thickness α (nm) of the film 25 satisfies 10≤α≤15. In Embodiment 1, thickness α=10 (nm).

In the film 25, "the ratio Cf/Cp" of the number of fluorine atoms Cf to the number of phosphorus atoms Cp is obtained using the following method. That is, after being initially charged, the battery 1 is disassembled in an environment not exposed to air to extract the positive electrode sheet 21. After being washed, the positive electrode sheet 21 is analyzed using Quantera II which is a scanning X-ray photoelectron spectrometer (μ-XPS; manufactured by ULVAC-PHI Inc.). Specifically, based on the amounts of all the elements in wide scanning analysis of 0 eV to 1100 eV, the proportion (Atom %) of each of fluorine and phosphorus is obtained, and the ratio Cf/Cp is calculated.

"The thickness α" of the film 25 is obtained using the following method. That is, after being initially charged, the battery 1 is disassembled in an environment not exposed to air to extract the positive electrode sheet 21. After washing the positive electrode sheet 21, a piece of the positive electrode active material particle 24 is prepared using a focused ion beam system FB-2100 (manufactured by Hitachi High-Technologies Corporation). Further, a cut surface of the positive electrode active material particle 24 is observed using an ultra-thin film evaluation system HD-2300 (manufactured by Hitachi High-Technologies Corporation) to measure the thickness α of the film 25.

The distribution of the ratio Cft/Cpt in the thickness direction of the film 25 is obtained using the following method. Cft represents the number of fluorine atoms at a certain position in the thickness direction of the film. Cpt represents the number of phosphorus atoms at a certain position in the thickness direction of the film. That is, after being initially charged, the battery 1 is disassembled in an environment not exposed to air to extract the positive electrode sheet 21. After washing the positive electrode sheet 21, the positive electrode active material particle 24 is analyzed using Quantera II which is a scanning X-ray photoelectron spectrometer (μ-XPS; manufactured by ULVAC-PHI Inc.). Specifically, by performing XPS every two minutes while performing ion sputtering, the distribution of the ratio Cft/Cpt in the thickness direction of the film 25 is measured.

Figure 7:
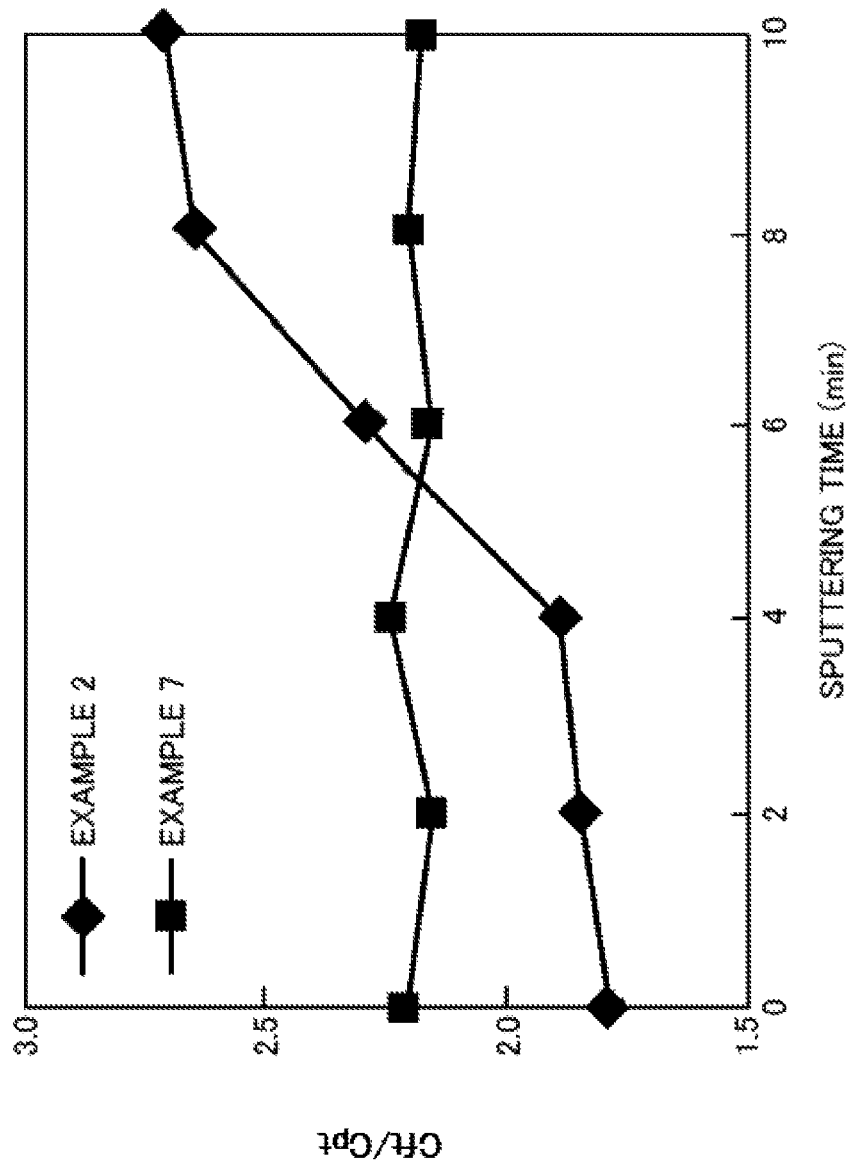
FIG. 7 is a graph showing a relationship between a sputtering time and a film ratio Cf/Cp in each of batteries according to Examples 2 and 7.

As a result, a relationship between the sputtering time (min) and the ratio Cft/Cpt which is shown in Example 2 of FIG. 7 is obtained. When the sputtering time is within a range of 0 minutes to 4 minutes, the ratio Cft/Cpt decreases. On the other hand, when the sputtering time exceeds 4 minutes, the ratio Cft/Cpt increases. It can be seen from the results that the ratio Cft/Cpt is higher in the inner portion 25a of the film 25 than in the outer portion 25b of the film 25, that is, the amount of fluorine (F) is large in the inside of the film 25 in the thickness direction MH, and the amount of phosphorus (P) is large in the outside of the film 25 in the thickness direction MH.

Next, the negative electrode sheet 31 will be described. In the negative electrode sheet 31, a negative electrode active material layer 33 having a belt shape is provided in a region in the width direction, on both main surfaces of a negative electrode current collector foil 32 which is a belt-shaped copper foil, the region extending along the longitudinal direction. The negative electrode active material layer 33 contains negative electrode active material particles, a binder, and a thickener. In Embodiment 1, graphite particles are used as the negative electrode active material particles, styrene-butadiene rubber (SBR) is used as the binder, and carboxymethyl cellulose (CMC) is used as the thickener. In one end portion of the negative electrode current collector foil 32 in the width direction, the negative electrode current collector portion 31m is provided in which the negative electrode current collector foil 32 is exposed without the negative electrode active material layer 33 being present in the thickness direction. The negative electrode terminal 51 is welded to the negative electrode current collector portion 31m. The separator 39 is a porous film formed of a resin and has a belt shape.

Next, the nonaqueous electrolytic solution 40 will be described. The nonaqueous electrolytic solution 40 is accommodated in the battery case 10, a portion of the nonaqueous electrolytic solution 40 is impregnated into the electrode body 20, and the remaining nonaqueous electrolytic solution 40 remains in the bottom of the battery case 10 as an excess liquid. An electrolyte of the nonaqueous electrolytic solution 40 is lithium hexafluorophosphate ($LiPF_6$), and the concentration thereof is 1.0 M. A nonaqueous solvent of the nonaqueous electrolytic solution 40 is a mixed organic solvent containing ethylene carbonate (EC) and ethyl methyl carbonate (EMC) at a volume ratio of 1:1. As described above, the nonaqueous electrolytic solution 40 contains $LiPF_6$ as a compound containing fluorine.

Next, a method of manufacturing the battery 1 will be described. First, the positive electrode sheet 21 is formed. Specifically, in Embodiment 1, the positive electrode active material particles 24x are prepared. The positive electrode active material particles 24x are formed of a lithium transition metal composite oxide, specifically, $LiNi_{0.5}Mn_{1.5}O_4$ which is a lithium nickel manganese composite oxide having a spinel-type crystal structure, in which the ratio Da/Db of the amount Da of lithium (Li) to the amount Db of a transition metal composite oxide portion ($Ni_{0.5}Mn_{1.5}O_4$) excluding lithium satisfies 1.1≤Da/Db≤1.2 (in Embodiment 1, Da/Db=1.1).

In "first film forming step", a first film 25c containing fluorine is formed on a particle surface 24xn of each of the positive electrode active material particles 24x (refer to FIG. 4). Specifically, in an temperature environment of 25° C., the positive electrode active material particles 24x are exposed to an atmosphere of fluorine gas for 1 hour to form the first film 25c containing fluorine on the particle surfaces 24xn of the positive electrode active material particles 24x. By controlling the gas pressure of the fluorine gas, the thickness of the first film 25c can be adjusted. Specifically, as the gas pressure increases, the thickness of the first film 25c can increase. In Embodiment 1, the gas pressure is 700 Pa.

Next, in "positive electrode sheet forming step", the positive electrode active material particles 24x on which the first film 25c is formed, the conductive material 26 (acetylene black), the binder 27 (polyvinylidene fluoride), and the phosphorus compound 28 (lithium phosphate) are put into the solvent (in Embodiment 1, NMP), and the components are mixed with each other to prepare a positive electrode paste. A weight ratio of the mixing amounts of the positive electrode active material particles 24x, the conductive material 26, the binder 27, and the phosphorus compound 28 is 92.1:4:3:0.9. Next, the positive electrode paste is applied to one main surface of the positive electrode current collector foil 22, which is a belt-shaped aluminum foil, and is dried to form the positive electrode active material layer 23. Further, the positive electrode paste is applied to the other main surface of the positive electrode current collector foil 22 and is dried to form the positive electrode active material layer 23. Next, the positive electrode active material layer 23 is pressed to obtain the positive electrode sheet 21. Separately, the negative electrode sheet 31 is formed.

Next, in "construction step", the positive electrode sheet 21 and the negative electrode sheet 31 are laminated with the pair of separators 39 interposed therebetween to obtain a laminate, and this laminate is wound using a winding core. Further, this wound body is pressed into a flat shape to form the electrode body 20. Separately, the case lid 13, the internal terminal member 53, the external terminal member 54, the bolt 55, the internal insulating member 57, and the external insulating member 58 are prepared. Each of the positive electrode terminal 50 and the negative electrode terminal 51 includes the internal terminal member 53, the external terminal member 54, and the bolt 55 and is fixed to the case lid 13 through the internal insulating member 57 and the external insulating member 58 which are formed of a resin. The positive electrode terminal 50 and the negative electrode terminal 51, which are integrated with the case lid 13, are welded to the positive electrode current collector portion 21m and the negative electrode current collector portion 31m of the electrode body 20, respectively. Next, the case body 11 is prepared, and the electrode body 20 is accommodated in the case body 11. Next, the case lid 13 is welded to the case body 11 to form the battery case 10. Next, the nonaqueous electrolytic solution 40 is injected into the battery case 10 through the liquid injection hole 13h and is impregnated into the electrode body 20. Next, the liquid injection hole 13h is sealed with the sealing member 15.

Next, in "initial charging step", the battery is initially charged to form a second film 25d containing phosphorus. The film 25 includes the first film 25c and the second film 25d and is formed so as to satisfy $1.89 \leq Cf/Cp \leq 2.61$. Specifically, the battery is charged at a constant current of 0.3 C until the battery voltage reaches 4.9 V (SOC 100%) from 0 V (SOC 0%). By controlling the charging current value during this initial charging, the thickness of the second film 25d can be adjusted. Specifically, as the initial charging current value increases, the thickness of the second film 25d can increase.

During the initial charging, the nonaqueous solvent of the nonaqueous electrolytic solution 40 is oxidized and decomposed on the particle surfaces 24n of the positive electrode active material particles 24 to produce hydrogen ions. These hydrogen ions react with the compound containing fluorine (specifically, $LiPF_6$) in the nonaqueous electrolytic solution 40 to produce hydrofluoric acid (HF). Further, this hydrofluoric acid reacts with the phosphorus compound 28 (lithium phosphate) in the positive electrode active material layer 23. As a result, the second film 25d containing phosphorus is formed on the first film 25c. In addition to phosphorus, the second film 25d contains decomposition products of components (an electrolyte and a nonaqueous solvent) which form the nonaqueous electrolytic solution 40. By using the first film 25c and the second film 25d, the film 25 satisfying $1.89 \leq Cf/Cp \leq 2.61$ is formed. Next, various inspections are performed on this battery. Thus, the battery 1 is completed.

Next, Embodiment 2 will be described. In Embodiment 1, the positive electrode active material particles 24x are exposed to an atmosphere of "fluorine gas" to form the first film 25c containing fluorine on the particle surfaces 24xn of the positive electrode active material particles 24x. On the other hand, Embodiment 2 is different from Embodiment 1, in that the positive electrode active material particles 24x are exposed to an atmosphere of "nitrogen trifluoride gas" to form a first film 125c containing fluorine on the particle surfaces 24xn of the positive electrode active material particles 24x.

A battery 100 according to Embodiment 2 has the same configurations as the battery 1 according to Embodiment 1, except for positive electrode active material particles 124. In Embodiment 2, the positive electrode active material particles 124 are formed of a lithium transition metal composite oxide, specifically, $LiNi_{0.5}Mn_{1.5}O_4$ which is a lithium nickel manganese composite oxide having a spinel-type crystal structure. As in the case of Embodiment 1, the battery 100 according to Embodiment 2 is manufactured using the positive electrode active material particles 24x in which the ratio Da/Db of the amount Da of lithium (Li) to the amount Db of a transition metal composite oxide portion ($Ni_{0.5}Mn_{1.5}O_4$) excluding lithium in the composition ($LiNi_{0.5}Mn_{1.5}O_4$) satisfies $1.1 \leq Da/Db \leq 1.2$. In Embodiment 2, Da/Db=1.1.

A film 125 containing fluorine and phosphorus is formed on a particle surface 124n of each of the positive electrode active material particles 124 (refer to FIG. 4). In addition to fluorine and phosphorus, the film 125 contains decomposition products of other components (an electrolyte and a nonaqueous solvent) of the nonaqueous electrolytic solution 40. In the film 125, a ratio Cf/Cp of the number of fluorine atoms Cf to the number of phosphorus atoms Cp satisfies $1.89 \leq Cf/Cp \leq 2.61$. In Embodiment 2, Cf/Cp=2.05.

In the film 125, the ratio Cf/Cp is higher in an inner portion 125a than in an outer portion 125b, the inner portion 125a being provided inside the center in the thickness direction MH, and the outer portion 125b being provided outside the center in the thickness direction MH. A thickness α (nm) of the film 125 satisfies $10 \leq \alpha \leq 15$. In Embodiment 2, thickness α=10 (nm). The amount β of Mn—F on the particle surfaces 124n of the positive electrode active material particles 124, which is measured by TOF-SIMS described below, satisfies $8.2 \leq \beta \leq 8.7$. In Embodiment 2, β=8.5.

"The amount β of Mn—F" on the particle surfaces 124n of the positive electrode active material particles 124 is obtained using the following method. That is, after being initially charged, the battery 100 is disassembled in an environment not exposed to air to extract the positive electrode sheet 21. After being washed, the positive electrode sheet 21 is analyzed using a time-of-flight secondary ion mass spectrometer (TOF-SIMS; TOF SIMS 5, manufactured by ION-TOF GmbH). "Mn—F bond" on the particle surfaces 124n of the positive electrode active material particles 124 is detected as "$MnF_2$" during TOF-SIMS. Therefore, by inspecting the secondary ion intensity of the $MnF_2$ component, the amount β of Mn—F can be obtained. When a measurement is performed under the following measurement conditions, a ratio (%) of the secondary ion intensity of the $MnF_2$ component to the total detection intensity of all the secondary ions having a mass number (m/z) of 110 or less is obtained using the following calculation expression, and the obtained value is set as the amount β (%) of Mn—F.

Measurement Conditions

Primary ion: Bi3++

Accelerating voltage: 25 kV

Antistatic electron neutralization gun during analysis: used

Analysis region: 200 μm×200 μm

Calculation Expression $$\text{Amount } \beta \text{ of Mn—F} = \{(\text{Secondary Ion Intensity of } MnF_2 \text{ Component})/(\text{Total Detection Intensity of All Secondary Ions Having Mass Number (m/z) of 110 or Less})\} \times 100 (\%)$$

Next, a method of manufacturing the battery 100 will be described. First, as in the case of Embodiment 1, the positive electrode active material particles 24x are prepared. In "first film forming step", the first film 125c containing fluorine is formed on the particle surface 24xn of each of the positive electrode active material particles 24x (refer to FIG. 4). Specifically, in an temperature environment of 25° C., the positive electrode active material particles 24x are exposed to an atmosphere of nitrogen trifluoride gas for 1 hour to form the first film 125c containing fluorine on the particle surfaces 24xn of the positive electrode active material particles 24x.

At this time, fluorine (F) of nitrogen trifluoride gas is bonded to manganese (Mn) on the particle surfaces 24xn of the positive electrode active material particle 24x (forms a Mn—F bond with manganese on the particle surfaces 24xn). When measured by TOF-SIMS, this Mn—F bond satisfies $8.2 \leq \beta \leq 8.7$ as described above. In Embodiment 2, amount $\beta$ of Mn—F=8.5. In Embodiment 1, fluorine gas is used for forming the first film 25c. Fluorine gas has a high fluorination intensity. Therefore, en fluorine gas is used, it is difficult to form a Mn—F bond. On the other hand, in Embodiment 2, nitrogen trifluoride gas is used for forming the first film 125c. Nitrogen trifluoride gas has a lower fluorination intensity than fluorine gas. Therefore, when nitrogen trifluoride gas is used, a Mn—F bond can be easily formed. The amount $\beta$ of Mn—F can be easily adjusted within a range of $8.2 \leq \beta \leq 8.7$.

By controlling the gas pressure of the nitrogen trifluoride gas, the thickness of the first film 125c can be adjusted. Specifically, as the gas pressure increases, the thickness of the first film 125c can increase. In Embodiment 2, the gas pressure is 700 Pa. In the battery 1 of Embodiment, 1, Cf/Cp=2.23. On the other hand, in the battery 100 of Embodiment 2, Cf/Cp=2.05 which is lower than that of the battery 1 of Embodiment 1. The reason for this is presumed that, since nitrogen trifluoride gas has a lower fluorination intensity than fluorine gas, the amount of fluorine bonded to the particle surfaces 24xn in the first film forming step of Embodiment 2 is less than that of Embodiment 1.

Next, in "positive electrode sheet forming step", the positive electrode active material particles 24x on which the first film 125c is formed, the conductive material 26 (acetylene black), the binder 27 (polyvinylidene fluoride), and the phosphorus compound 28 (lithium phosphate) are put into the solvent (NMP) to prepare a positive electrode paste as in the case of Embodiment 1. Further, using this positive electrode paste, the positive electrode sheet 21 is formed as in the case of Embodiment 1.

Next, "construction step" is performed as in the case of Embodiment 1. Next, by performing "the initial charging step" as in the case of Embodiment 1, a second film 125d containing phosphorus is formed, and then the film 125, which includes the first film 125c and the second film 125d and satisfies $1.89 \leq Cf/Cp \leq 2.61$, is formed. Next, various inspections are performed on this battery as in the case of Embodiment 1. Thus, the battery 100 is completed.

Next, the results of an experiment which was performed to verify the effects of the invention will be described. First, five batteries of Examples 1 to 3 and Comparative Examples 1 and 2 were prepared while changing a ratio Cf/Cp of the number of fluorine atoms Cf to the number of phosphorus atoms Cp in a film formed on particle surfaces of positive electrode active material particles. Specifically, in "the first film forming step", the gas pressure, in which the positive electrode active material particles 24x were treated with fluorine gas, was changed as shown in Table 1 so as to make the thicknesses of the first films containing fluorine different from each other. In Comparative Example 1, the treatment using fluorine gas was not performed. The film ratios Cf/Cp of the prepared batteries were 1.48 (Comparative Example 1), 1.89 (Example 1), 2.23 (Example 2), 2.61 (Example 3), and 3.35 (Comparative Example 2). The battery of Example 2 corresponds to the above-described battery 1 of Embodiment 1. Configurations other than the above-described configurations are the same as those of the battery 1 of Embodiment 1.

In all the batteries of Examples 1 to 3 and Comparative Examples 1 and 2, the total thickness $\alpha$ (nm) of the film was about 10 nm (refer to Table 1). In these batteries, the ratio Da/Db of the amount Da of lithium (Li) to the amount Db of the amount of the transition metal composite oxide portion ($Ni_{0.5}Mn_{1.5}O_4$) was 1.1.

TABLE 1

| | Gas Pressure (Pa) | Ratio Cf/ Cp | Thickness $\alpha$ (nm) | Ratio Da/ Db | Battery Resistance Ratio | Capacity Retention (%) |
|---|---|---|---|---|---|---|
| Comparative Example 1 | — | 1.48 | 9 | 1.1 | 1.0 | 86.1 |
| Example 1 | 400 | 1.89 | 9 | 1.1 | 1.1 | 89.0 |
| Example 2 | 700 | 2.23 | 10 | 1.1 | 1.2 | 90.8 |
| Example 3 | 1300 | 2.61 | 10 | 1.1 | 1.5 | 91.8 |
| Comparative Example 2 | 4000 | 3.35 | 11 | 1.1 | 2.1 | 92.7 |

Figure 5:
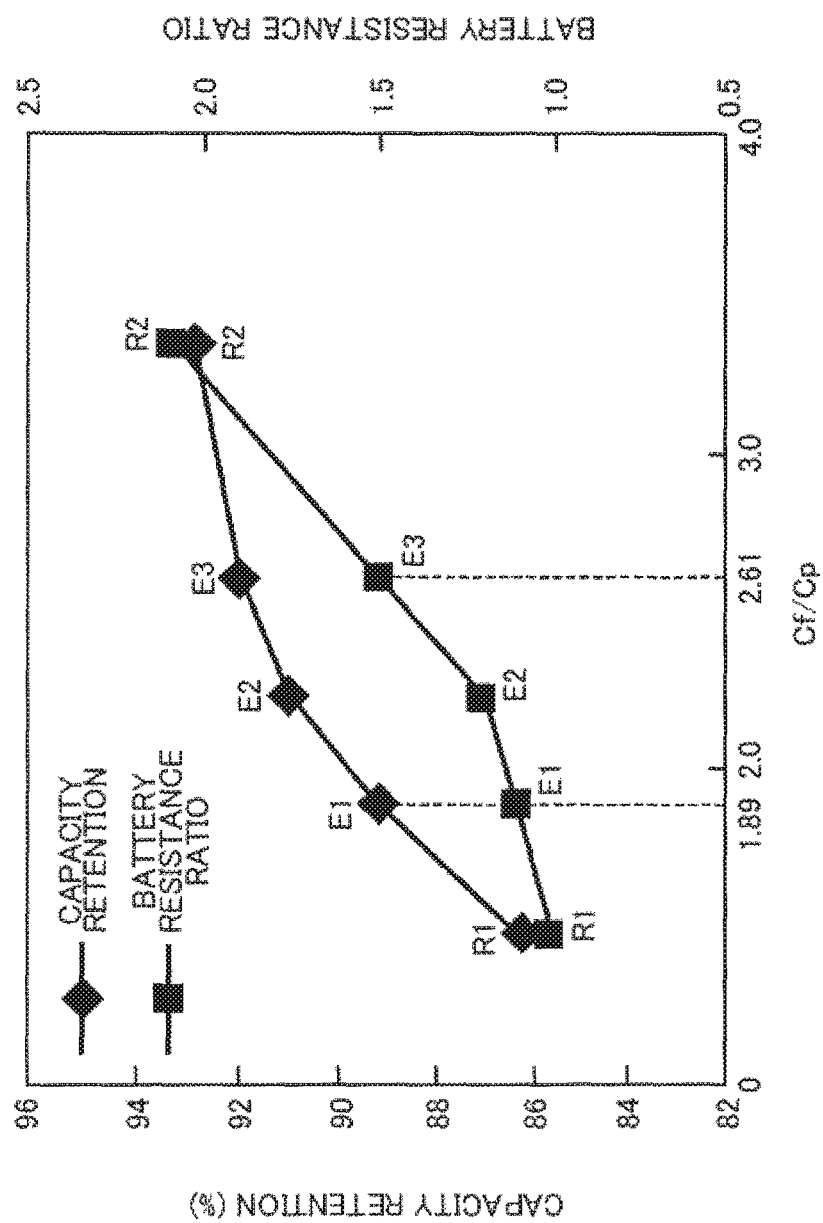
FIG. 5 is a graph showing a relationship between a film ratio Cf/Cp, a capacity retention, and a battery resistance ratio in each of batteries according to Examples 1 to 3 and Comparative Examples 1 and 2.

Next, regarding each of the batteries of Examples 1 to 3 and Comparative Examples 1 and 2, the battery resistance (IV resistance) was measured. Specifically, in a temperature environment of 25° C., the SOC of each of the batteries was adjusted to 60%, and then the battery was discharged at a constant current of 0.3 C for 10 seconds. After completion of discharging, the battery voltage value was measured. Further, the battery was discharged for 10 seconds under the same conditions as described above, except that only the discharge current value was changed to 1 C, 3 C, or 5 C. After completion of 10 seconds of discharging, the battery voltage value was measured. Next, this data was plotted on a coordinate plane in which the horizontal axis represents the discharge current value and the vertical axis represents the battery voltage value. Then, an approximation straight line (linear) was calculated using a least-square method, and the slope thereof was obtained as an IV resistance value. "Battery resistance ratio" of each of the other batteries was calculated with respect to the battery resistance (IV resistance) of the battery of Comparative Example 1 set as a reference (=1.0). The results are shown in Table 1 and FIG. 5. In FIG. 5, Examples 1 to 3 are shown as E1 to E3, and Comparative Examples 1 and 2 were shown as R1 and R2, respectively.

Regarding each of the batteries of Examples 1 to 3 and Comparative Examples 1 and 2, "charging-discharging cycle test" was performed to obtain a capacity retention (%) of the capacities before and after the test. Specifically, in a temperature environment of 60° C., the battery voltage of each of the batteries was adjusted to 3.5 V. Then, the battery was charged to 4.9 V at a constant current of 2 C, and the operation was stopped for 10 minutes. Next, the battery was discharged to 3.5 V at a constant current of 2 C, and the operation was stopped for 10 minutes. The charging and discharging operations were set as one cycle. 200 cycles of the charging and discharging operations were repeated. The battery capacity was measured before and after the charging-discharging cycle test, and the capacity retention (%) was calculated as the ratio of the battery capacity after the test to the battery capacity before the test. The results are shown in Table 1 and FIG. 5.

First, in regard to the battery resistance ratio, it was found that, as is clearly seen from Table 1 and FIG. 5, as the film ratio Cf/Cp increases, the battery resistance ratio increases. The reason for this is presumed to be as follows. Since the film containing fluorine is a resistor, the battery resistance increases in response to an increase in fluorine content. On the other hand, since phosphorus has an effect of reducing the resistance of the film, the battery resistance decreases in response to an increase in phosphorus content. Therefore, as the ratio of the amount of fluorine to the amount of phosphorus in the film increases, that is, as the ratio Cf/Cp increases, the resistance of the film increases, and the battery resistance increases. It is considered from the above results that the battery resistance can be appropriately reduced by adjusting the ratio Cf/Cp to be 2.61 or lower.

Next, in regard to the capacity retention in the charging-discharging cycle test, it was found that, as is clearly seen from Table 1 and FIG. 5, as the film ratio Cf/Cp increases, the capacity retention increases. The reason for this is as follows. Since the amount of fluorine increases, the oxidation decomposition of the nonaqueous solvent of the nonaqueous electrolytic solution 40 on the particle surfaces of the positive electrode active material particles can be suppressed. Therefore, the production of hydrofluoric acid caused by the reaction between hydrogen ions, which is produced by the oxidation decomposition of the nonaqueous solvent, and fluorine in the nonaqueous electrolytic solution 40 can be reduced, and the elution of transition metal from the positive electrode active material particles caused by the action of hydrofluoric acid can be suppressed. Therefore, even after the charging-discharging cycle test, a decrease in battery capacity is suppressed. It is considered from the above results that a decrease in battery capacity caused by the charging-discharging cycle test can be appropriately suppressed by adjusting the ratio Cf/Cp to be 1.89 or higher. By adjusting the ratio Cf/Cp to satisfy 1.89≤Cf/Cp≤2.61 based on the above results, the battery resistance can be appropriately reduced while appropriately suppressing a decrease in battery capacity caused by the charging-discharging cycle test.

Next, four batteries of Examples 2 and 4 to 6 were prepared while changing the film thickness α on the particle surfaces of the positive electrode active material particles. Specifically, in the initial charging step, the charging current value was changed as shown in Table 2 so as to make the thicknesses of the second films containing phosphorus different from each other. The total film thicknesses α (nm) of the prepared batteries were 7 (Example 4), 10 (Example 2), 15 (Example 5), and 20 (Example 6). Configurations other than the above-described configurations are the same as those of the battery 1 of Embodiment 1.

Figure 6:
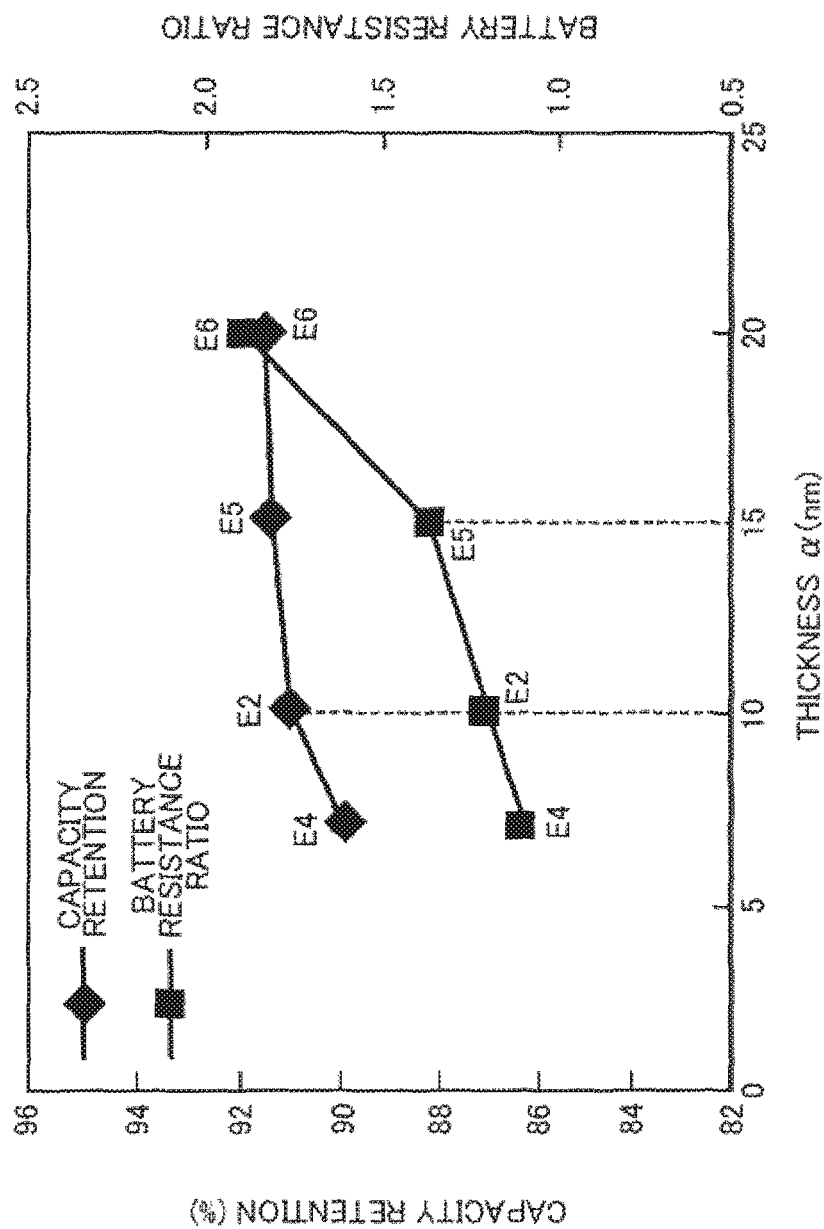
FIG. 6 is a graph showing a relationship between a film thickness α, a capacity retention, and a battery resistance ratio in each of batteries according to Examples 2 and 4 to 6.

In all the batteries of Examples 2 and 4 to 6, the film ratio Cf/Cp was about 2.2 (refer to Table 2). In these batteries, the ratio Da/Db of the amount Da of lithium (Li) to the amount Db of the amount of the transition metal composite oxide portion ($Ni_{0.5}Mn_{1.5}O_4$) was 1.1. Regarding each of the batteries of Examples 2 and 4 to 6, the battery resistance ratio and the capacity retention (%) after the charging-discharging cycle test were obtained as described above. The results are shown in Table 2 and FIG. 6. In FIG. 6, Examples 2 and 4 to 6 are shown as E2 and E4 to E6.

TABLE 2

|  | Charging Current Value (C) | Ratio Cf/Cp | Thickness α (nm) | Ratio Da/Db | Battery Resistance Ratio | Capacity Retention (%) |
| --- | --- | --- | --- | --- | --- | --- |
| Example 4 | 0.1 | 2.24 | 7 | 1.1 | 1.1 | 89.7 |
| Example 2 | 0.3 | 2.23 | 10 | 1.1 | 1.2 | 90.8 |
| Example 5 | 1.0 | 2.20 | 15 | 1.1 | 1.4 | 91.1 |
| Example 6 | 2.0 | 2.18 | 20 | 1.1 | 1.9 | 91.3 |

First, in regard to the battery resistance ratio, it was found that, as is clearly seen from Table 2 and FIG. 6, as the film thickness α increases, the battery resistance ratio increases. The reason for this is presumed to be as follows. The film is a resistor although it contains phosphorus. Therefore, as the thickness α increases, the battery resistance increases. It is considered from the above results that the film thickness α is preferably 15 nm or less.

Next, in regard to the capacity retention in the charging-discharging cycle test, it was found that, as is clearly seen from Table 2 and FIG. 6, as the film thickness α increases, the capacity retention increases. The reason for this is presumed to be as follows. As the film thickness α increases, the oxidation decomposition of the nonaqueous solvent of the nonaqueous electrolytic solution 40 on the particle surfaces of the positive electrode active material particles is suppressed, and the elution of transition metal from the positive electrode active material particles is suppressed. It is considered from the above results that the film thickness α (nm) is preferably 10 nm or more. It is considered from the above results that the film thickness α preferably satisfies 10≤β≤15.

Next, a battery of Example 7 was prepared in which a film was formed using a different method from that of the battery 1 of Embodiment 1. Specifically, in Example 7, the positive electrode active material particles 24x were not treated with fluorine gas (refer to FIG. 3). Instead, in order to prepare the positive electrode paste, 0.3 wt % of fluoride (specifically, lithium fluoride (LiF)) with respect to the positive electrode active material particles 24x was added to the positive electrode paste. Using this positive electrode paste, a positive electrode sheet was prepared, and then a battery was constructed. Configurations other than the above-described configurations are the same as those of the battery 1 of Embodiment 1.

TABLE 3

|  | Gas Pressure (Pa) | Fluoride (wt %) | Ratio Cft/Cpt | Thickness α (nm) | Ratio Da/Db | Battery Resistance Ratio | Capacity Retention (%) |
| --- | --- | --- | --- | --- | --- | --- | --- |
| Example 2 | 700 | — | 2.23 | 10 | 1.1 | 1.2 | 90.8 |
| Example 7 | — | 0.3 | 2.21 | 10 | 1.1 | 1.2 | 88.2 |

In this battery, during the initial charging step, lithium phosphate in the positive electrode active material layer is decomposed, lithium fluoride is decomposed, and a film containing phosphorus and fluorine is formed on the particle surfaces of the positive electrode active material particles. When the distribution of the ratio Cft/Cpt in the thickness direction of the film was investigated using the above-described method, a relationship shown in FIG. 7 between the sputtering time (min) and the ratio Cft/Cpt was obtained. The sputtering time was within a range of 0 minutes to 10 minutes, and the ratio Cft/Cpt was substantially constant. It was found from the above results that, in the battery of Example 7, the film ratio Cft/Cpt was substantially constant in the thickness direction MH, that is, the ratio of fluorine (F) to phosphorus (P) in the film was substantially constant in the thickness direction MH.

Figure 8:
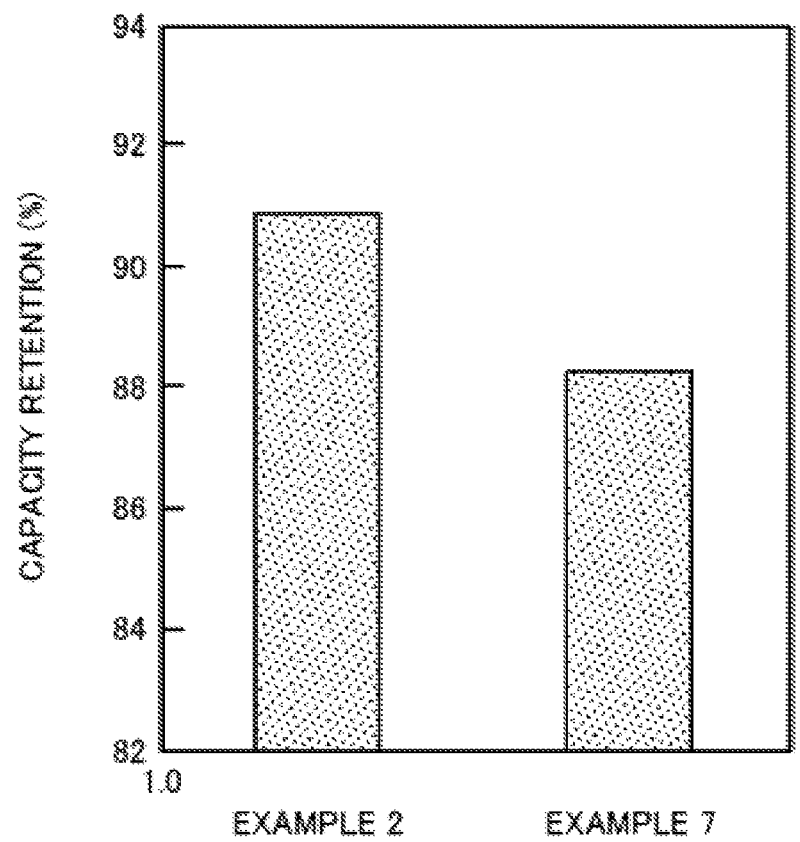
FIG. 8 is a graph showing a capacity retention in each of the batteries according to Examples 2 and 7.

The film ratio Cf/Cp in the battery of Example 7 was 2.21, which is the same as the film ratio Cf/Cp (=2.23) in the battery of Example 2. The film thickness α in the battery of Example 7 was 10 (nm), which is the same as the film thickness α in the battery of Example 2. The ratio Da/Db in the battery of Example 7 was 1.1, which is the same as the ratio Da/Db in the battery of Example 2. Next, regarding each of the batteries of Examples 2 and 7, the battery resistance ratio and the capacity retention (%) after the charging-discharging cycle test were obtained as described above. The results are shown in Table 3 and FIG. 8.

First, in regard to the battery resistance ratio, as is clearly seen from Table 3, the value of the battery of Example 2 was the same as the value (=1.2) of the battery of Example 7. On the other hand, in regard to the capacity retention in the charging-discharging cycle test, it was found that, as is clearly seen from Table 3 and FIG. 8, the capacity retention of the battery of Example 2 was higher than that of the battery of Example 7. It is considered from the above results that a decrease in battery capacity caused by the charging-discharging cycle test can be further suppressed by adjusting the ratio Cf1/Cp1 to be higher than the ratio Cf2/Cp2, where Cf1 represents the number of fluorine atoms in the inner portion, Cp1 represents the number of phosphorus atoms in the inner portion, Cf2 represents the number of fluorine atoms in the outer portion, and Cp2 represents the number of phosphorus atom in the outer portion.

Next, four batteries of Examples 8 to 11 were prepared using positive electrode active material particles which were prepared while changing the ratio Da/Db of the amount Da of lithium (Li) to the amount Db of the transition metal composite oxide portion ($Ni_{0.5}Mn_{1.5}O_4$). Specifically, the ratios Da/Db of the positive electrode active material particles used for preparing the batteries were 1.0 (Example 8), 1.1 (Example 9), 1.2 (Example 10), and 1.3 (Example 11). In all the batteries of Examples 8 to 11, the film ratio Cf/Cp was about 2.23 (refer to Table 4). In all the batteries, the film thickness α (nm) was 10.

TABLE 4

| | Ratio Cf/Cp | Thickness α (nm) | Ratio Da/Db | Battery Resistance Ratio | Initial Capacity Ratio |
|---|---|---|---|---|---|
| Example 8 | 2.23 | 10 | 1.0 | 1.30 | 0.925 |
| Example 9 | 2.23 | 10 | 1.1 | 0.96 | 0.995 |
| Example 10 | 2.23 | 10 | 1.2 | 0.99 | 1.010 |
| Example 11 | 2.23 | 10 | 1.3 | 1.28 | 1.015 |

A battery of Comparative Example 3 was prepared in which the film containing fluorine and phosphorus was not formed on the particle surfaces of the positive electrode active material particles. That is, in Comparative Example 3, the positive electrode active material particles 24x were not treated with fluorine gas. The positive electrode paste was prepared without addition of lithium phosphate, and the positive electrode sheet was prepared.

Figure 9:
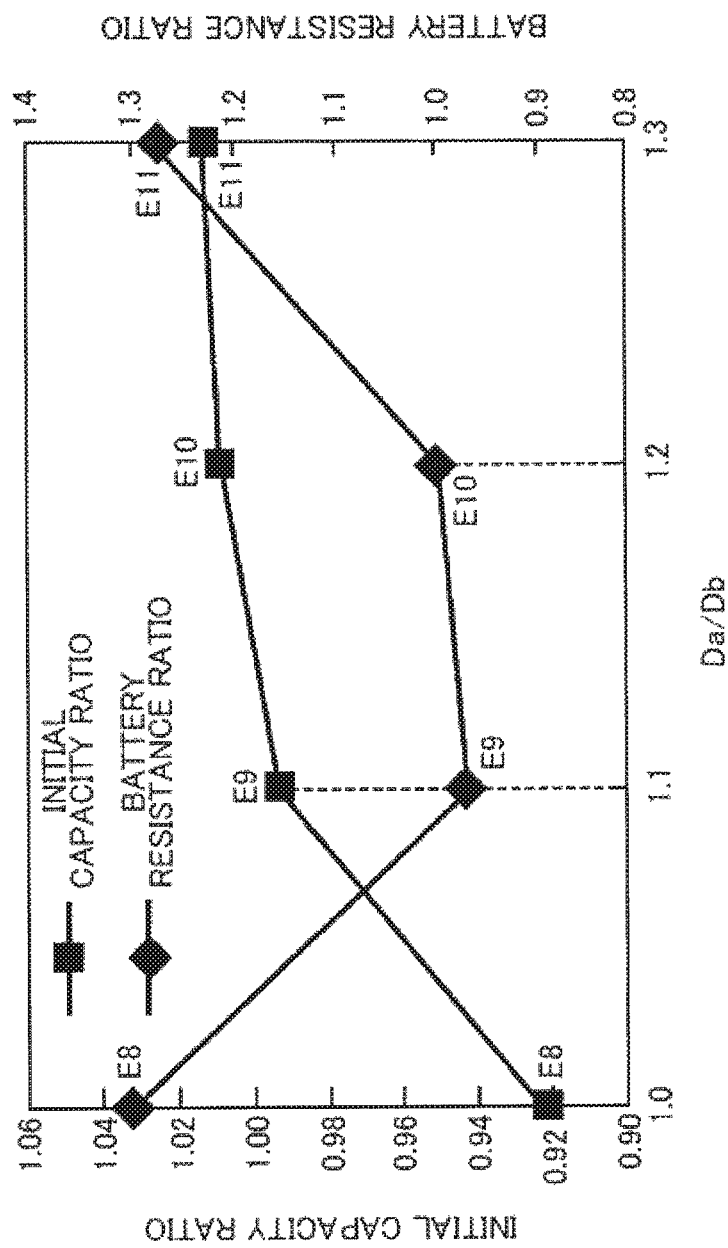
FIG. 9 is a graph showing a relationship between a ratio Da/Db of the amount of positive electrode active material particles, an initial capacity ratio, and a battery resistance ratio in each of batteries according to Example 8 to 11.

Next, regarding each of the batteries of Examples 8 to 11 and Comparative Example 3, the battery resistance ratio was obtained as described above. The battery resistance ratio of each of the batteries of Examples 8 to 11 was obtained with respect to the battery resistance of the battery of Comparative Example 3 set as a reference (=1.00). Regarding each of the batteries of Examples 8 to 11 and Comparative Example 3, the initial battery capacity was measured, and "initial capacity ratio" of each of the other batteries was calculated with respect to the battery capacity of the battery of Comparative Example 3 set as a reference (=1.000). The results are shown in Table 4 and FIG. 9. In FIG. 9, Examples 8 and 11 are shown as E8 to E11.

First, in regard to the battery resistance ratio, it was found that, as is clearly seen from Table 4 and FIG. 9, when the ratio Da/Db is lower than 1.1 or higher than 1.2, the battery resistance ratio increases; and when 1.1≤Da/Db≤1.2, the battery resistance ratio is low. The reason for this is presumed to be as follows. When Da/Db<1.1, the amount of lithium is excessively small, and lithium is excessively extracted from the positive electrode active material particles, which increases the battery resistance. On the other hand, when Da/Db>1.2, the amount of lithium is excessively large, and crystals of the positive electrode active material particles are strained, which increases the battery resistance.

Next, in regard to the initial capacity ratio, it was found that, as is clearly seen from Table 4 and FIG. 9, as the ratio Da/Db increases, the initial capacity ratio increases; in particular, when Da/Db≥1.1, the initial capacity ratio increases. The reason for this is presumed to be as follows. Fluorine has strong oxidizability even at a normal temperature and reacts with lithium of the positive electrode active material to form lithium fluoride. Therefore, when the film containing fluorine is formed on the particle surfaces of the positive electrode active material particles, the number of lithium atoms capable of contributing to a cell reaction is reduced, and thus the initial battery capacity decreases. As Da/Db increases, the amount of lithium present in the positive electrode active material particles used increases. Therefore, although lithium fluoride is produced, a decrease in battery capacity can be suppressed. Based on the above results, it is preferable that a battery is constructed using the positive electrode active material particles satisfying 1.1≤Da/Db≤1.2.

Next, five batteries of Examples 12 to 16 were prepared while changing the amount β of Mn—F on the particle surfaces of the positive electrode active material particles. Specifically, the amounts β of Mn—F in the prepared batteries were 8.0 (Example 12), 8.2 (Example 13), 8.5 (Example 14), 8.7 (Example 15), and 8.9 (Example 16), respectively. In all the batteries of Examples 12 to 16, the film ratio Cf/Cp was about 2.05 (refer to Table 5). In all the batteries, the film thickness α (nm) was 10. In these batteries, the ratio Da/Db of the amount Da of lithium (Li) to the amount Db of the amount of the transition metal composite oxide portion ($Ni_{0.5}Mn_{1.5}O_4$) was 1.1.

Figure 10:
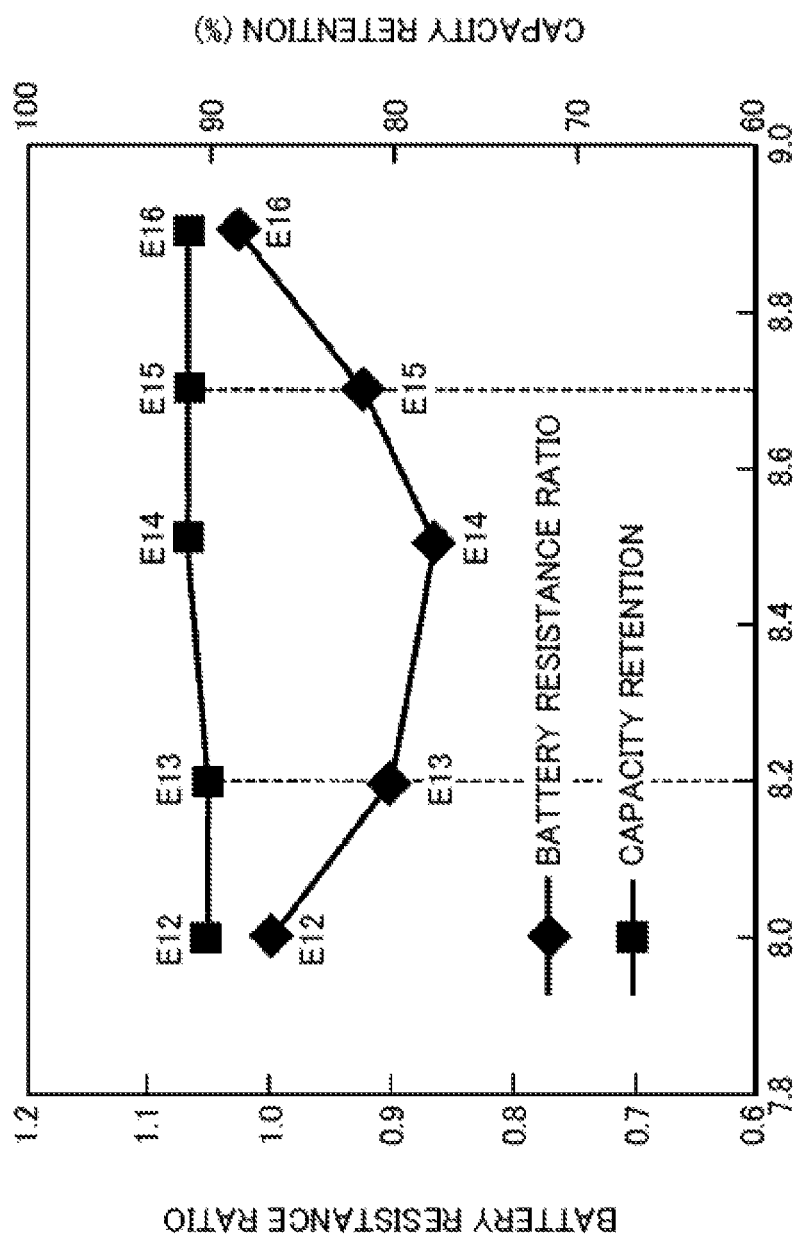
FIG. 10 is a graph showing the amount β of Mn—F on particle surfaces of positive electrode active material particles, a battery resistance ratio, and a capacity retention in each of batteries according to Examples 12 to 16.

Regarding each of the batteries of Examples 12 to 16, the battery resistance ratio and the capacity retention (%) after the charging-discharging cycle test were obtained as described above. The results are shown in Table 5 and FIG. 10. "The battery resistance ratio" of each of the batteries of Examples 13 to 16 was obtained with respect to the battery resistance of the battery of Example 12 set as a reference (=1.00). In FIG. 10, Examples 12 to 16 are shown as E12 to E16.

TABLE 5

| | Amount β of Mn—F | Ratio Cf/Cp | Thickness α (nm) | Ratio Da/Db | Battery Resistance Ratio | Capacity Retention (%) |
|---|---|---|---|---|---|---|
| Example 12 | 8.0 | 2.05 | 10 | 1.1 | 1.00 | 90 |
| Example 13 | 8.2 | 2.05 | 10 | 1.1 | 0.90 | 90 |
| Example 14 | 8.5 | 2.05 | 10 | 1.1 | 0.86 | 91 |
| Example 15 | 8.7 | 2.05 | 10 | 1.1 | 0.92 | 91 |
| Example 16 | 8.9 | 2.05 | 10 | 1.1 | 1.02 | 91 |

In regard to the battery resistance ratio, it was found that, as is clearly seen from Table 5 and FIG. 10, when the amount β of Mn—F is lower than 8.2 or higher than 8.7, the battery resistance ratio increases; and when $8.2 \leq \beta \leq 8.7$, the battery resistance ratio is low. The reason for this is presumed to be as follows. When $\beta < 8.2$, a desolvation effect of lithium ions obtained by a Mn—F bond is low, which increases the battery resistance. On the other hand, when $\beta > 8.7$, crystals of the positive electrode active material particles are strained, which increases the battery resistance. It is presumed from the above results that the amount β of Mn—F preferably satisfies $8.2 \leq \beta \leq 8.7$.

Next, in regard to the capacity retention in the charging-discharging cycle test, as is clearly seen from Table 5 and FIG. 10, when the amount β of Mn—F is at least within the range of Examples 12 to 16 ($8.0 \leq \beta \leq 8.9$), the capacity retention is substantially constant and is superior (90% to 91%) irrespective of a large amount β of Mn—F. Accordingly, by adjusting the amount β of Mn—F to satisfy $8.2 \leq \beta \leq 8.7$, a decrease in battery capacity caused by the charging-discharging cycle test can be appropriately suppressed while appropriately reducing the battery resistance.

As described above, in the batteries 1, 100 of Embodiments 1, 2, the films 25, 125 containing fluorine and phosphorus are formed on the particle surfaces 24n, 124n of the positive electrode active material particles 24, 124. In the films 25, 125, a ratio Cf/Cp of the number of fluorine atoms Cf to the number of phosphorus atoms Cp satisfies $1.89 \leq Cf/Cp \leq 2.61$. A decrease in battery capacity caused by the charging-discharging cycle test can be appropriately suppressed by adjusting the ratio Cf/Cp to satisfy $Cf/Cp \geq 1.89$. On the other hand, the battery resistance can be appropriately reduced by adjusting Cf/Cp to satisfy $Cf/Cp \leq 2.61$. Accordingly, in these batteries 1, 100, the battery resistance can be appropriately reduced while appropriately suppressing a decrease in battery capacity caused by the charging-discharging cycle test.

Further, in Embodiments 1, 2, the thicknesses α (nm) of the film 25, 125 containing fluorine and phosphorus satisfies $10 \leq \alpha \leq 15$. When the thicknesses α of the films 25, 125 are excessively small, specifically, less than 10 nm, the battery capacity decreases in the charging-discharging cycle test. On the other hand, when the thicknesses α of the films 25, 125 are excessively large, specifically, more than 15 nm, the battery resistance increases. On the other hand, in the batteries 1, 100, the thicknesses α (nm) of the films 25, 125 satisfy $10 \leq \alpha \leq 15$. Therefore, a decrease in battery capacity caused by the charging-discharging cycle test can be more efficiently suppressed, and the battery resistance can be more efficiently reduced.

In Embodiments 1, 2, the ratio Cf/Cp is higher in the inner portions 25a, 125a of the films 25, 125 than in the outer portions 25b, 125b of the films 25, 125. As a result, a decrease in battery capacity caused by the charging-discharging cycle test can be further suppressed as compared to a film in which the ratio Cf/Cp in the thickness direction MH is constant.

The batteries 1, 100 of Embodiments 1, 2 are manufactured using the positive electrode active material particles 24x in which the ratio Da/Db of the amount Da of lithium (Li) to the amount Db of a transition metal composite oxide portion ($Ni_{0.5}Mn_{1.5}O_4$) excluding lithium in the composition (specifically, $LiNi_{0.5}Mn_{1.5}O_4$) of the lithium transition metal composite oxide satisfies $1.1 \leq Da/Db \leq 1.2$. A decrease in initial battery capacity can be suppressed by adjusting Da/Db to satisfy $Da/Db \geq 1.1$. The battery resistance can be appropriately reduced by adjusting Da/Db to satisfy $1.1 \leq Da/Db \leq 1.2$. Accordingly, in the batteries 1, 100 of Embodiments 1, 2, a decrease in initial battery capacity can be appropriately suppressed, and the battery resistance can be appropriately reduced.

In Embodiment 2, the amount β of Mn—F on the particle surfaces 124n of the positive electrode active material particles 124 satisfies $8.2 \leq \beta \leq 8.7$. The battery resistance can be appropriately reduced by adjusting β to satisfy $8.2 \leq \beta \leq 8.7$. On the other hand, at least within a range of $8.2 \leq \beta \leq 8.7$, a decrease in battery capacity caused by the charging-discharging cycle test is substantially constant and can be appropriately suppressed. Accordingly, in the battery 100 of Embodiment 2, a decrease in battery capacity caused by the charging-discharging cycle test can be appropriately suppressed while appropriately reducing the battery resistance.

According to the methods of manufacturing the batteries 1, 100, the first films 25c, 125c containing fluorine are formed on the particle surfaces 24xn of the positive electrode active material particles 24x (first film forming step), respectively. Next, the positive electrode sheet 21 is formed using the positive electrode active material particles 24x including the first films 25c, 125c and the phosphorus compound 28 (positive electrode sheet forming step). Further, the batteries are constructed (construction step) and are initially charged (initial charging step). In the initial charging step, the phosphorus compound 28 in the positive electrode active material layer 23 is decomposed, and the second films 25d, 125d containing phosphorus are formed. As a result, the films 25, 125 containing fluorine and phosphorus and satisfying $1.89 \leq Cf/Cp \leq 2.61$ can be easily formed.

In the manufacturing methods, the first films 25c, 125c containing fluorine are formed, and then the second films 25d, 125d containing phosphorus are formed. Therefore, in the films 25, 125 including the first films 25c, 125c and the second films 25d, 125d, the ratio Cf/Cp is higher in the inner portions 25a, 125a than in the outer portion 25b, 125b, the inner portions 25a, 125a being provided inside the center in the thickness direction MH, and the outer portion 25b, 125b being provided outside the center in the thickness direction MH. As a result, in the manufactured batteries 1, 100, a decrease in battery capacity caused by the charging-discharging cycle test can be further suppressed as compared to a film in which the ratio Cf/Cp in the thickness direction MH is constant.

In Embodiments 1, 2, in the first film forming step, the positive electrode active material particles 24x are exposed to an atmosphere containing fluorine gas (Embodiment 1) or an atmosphere containing nitrogen trifluoride gas (Embodiment 2) to form the first films 25c, 125c. As a result, the first films 25c, 125c containing fluorine can be easily formed. Particularly, in Embodiment 2, nitrogen trifluoride gas is used. Therefore, a Mn—F bond can be easily formed, and the amount β of Mn—F can be easily adjusted to be within a range of $8.2 \leq \beta \leq 8.7$.

Hereinabove, the invention has been described using Embodiments 1, 2. However, the invention is not limited to Embodiments 1, 2 described above, and appropriate modifications can be made within a range not departing from the scope of the invention. For example, in Embodiment 1, in the first film forming step, the positive electrode active material particles 24x are exposed to "fluorine gas" to form the first film 25c. In Embodiment 2, the positive electrode active material particles 24x are exposed to "nitrogen trifluoride gas" to form the first film 125c. However, the invention is not limited to these configurations. For example, in the first film forming step, first, the positive electrode active material particles 24x may be exposed to "nitrogen trifluoride gas" and exposed to "fluorine gas" to form the first film. In the first film forming step, the positive electrode active material particles 24x may be exposed to an atmosphere containing "fluorine gas" and "nitrogen trifluoride gas" to form the first film.

What is claimed is:

1. A lithium ion secondary battery comprising:
   a positive electrode sheet that includes a positive electrode active material layer containing a positive electrode active material particle;
   a negative electrode sheet; and
   a nonaqueous electrolytic solution that contains a compound containing fluorine, wherein
   a surface of the positive electrode active material particle includes a film containing fluorine and phosphorus,
   a ratio Cf/Cp satisfies $1.89 \leq Cf/Cp \leq 2.61$ where Cf represents the number of fluorine atoms in the film, and Cp represents the number of phosphorus atoms in the film,
   a thickness α of the film satisfies $10 \text{ nm} \leq \alpha \leq 15 \text{ nm}$,
   the positive electrode active material particle is formed of a lithium nickel manganese composite oxide having a spinel-type crystal structure,
   Mn—F molecular bonds are present between fluorine atoms of the film and manganese atoms on the surface of the positive electrode active material particle,
   an amount β of Mn—F on the surface of the positive electrode active material particle measured by TOF-SIMS satisfies $8.2 \leq \beta \leq 8.7$, and
   the amount β of Mn—F is calculated from the expression: {(Secondary Ion Intensity of $MnF_2$ Component)/(Total Detection Intensity of All Secondary Ions Having Mass Number (m/z) of 110 or Less)}×100(%).

2. The lithium ion secondary battery according to claim 1, wherein
   the film includes:
   an outer portion provided outside a center in a thickness direction of the film; and
   an inner portion provided inside the center in the thickness direction of the film, and
   a value of Cf1/Cp1 is larger than a value of Cf2/Cp2 where Cf1 represents the number of fluorine atoms in the inner portion, Cp1 represents the number of phosphorus atoms in the inner portion, Cf2 represents the number of fluorine atoms in the outer portion, and Cp2 represents the number of phosphorus atom in the outer portion.

3. The lithium ion secondary battery according to claim 1, wherein a ratio Da/Db satisfies $1.1 \leq Da/Db \leq 1.2$ where Da represents a mole fraction of lithium in the lithium nickel manganese composite oxide, and Db represents a mole fraction of a nickel manganese composite oxide portion excluding lithium in the lithium nickel manganese composite oxide.

4. The lithium ion secondary battery according to claim 1, wherein
   the compound containing fluorine is at least one fluoride compound selected from the group consisting of AgF, $CoF_2$, $CoF_3$, CuF, $CuF_2$, $FeF_2$, $FeF_3$, LiF, $MnF_2$, $MnF_3$, $SnF_2$, $SnF_4$, $TiF_3$, $TiF_4$, and $ZrF_4$.

5. The lithium ion secondary battery according to claim 1, wherein
   the nonaqueous electrolytic solution includes, in addition to the compound containing fluorine, a fluoride compound as an additive, and
   the fluoride compound is at least one selected from the group consisting of AgF, $CoF_2$, $CoF_3$, CuF, $CuF_2$, $FeF_2$, $FeF_3$, LiF, $MnF_2$, $MnF_3$, $SnF_2$, $SnF_4$, $TiF_3$, $TiF_4$, and $ZrF_4$.

6. The lithium ion secondary battery according to claim 5, wherein
   the fluoride compound is of two or more selected from the group consisting of AgF, $CoF_2$, $CoF_3$, CuF, $CuF_2$, $FeF_2$, $FeF_3$, LiF, $MnF_2$, $MnF_3$, $SnF_2$, $SnF_4$, $TiF_3$, $TiF_4$, and $ZrF_4$.

7. A method of manufacturing a lithium ion secondary battery, the method comprising:
   forming a first film on a surface of a positive electrode active material particle, the first film containing fluorine;
   forming a positive electrode sheet that includes a positive electrode active material layer containing the positive electrode active material particle and a phosphorus compound after the forming of the first film;
   constructing a battery by using the positive electrode sheet, a negative electrode sheet, and a nonaqueous electrolytic solution after forming the positive electrode sheet, the nonaqueous electrolytic solution containing a compound containing fluorine; and
   initial charging of the battery to form a second film containing phosphorus on the first film after constructing the battery, the first film and the second film forming a combined film, wherein
   a ratio Cf/Cp satisfies $1.89 \leq Cf/Cp \leq 2.61$, where Cf represents the number of fluorine atoms in the combined film, and Cp represents the number of phosphorus atoms in the combined film,
   a thickness α of the combined film satisfies $10 \text{ nm} \leq \alpha \leq 15 \text{ nm}$,
   the positive electrode active material particle is formed of a lithium nickel manganese composite oxide having a spinel-type crystal structure,
   Mn—F molecular bonds between manganese atoms on the surface of the positive electrode active material particle and fluorine atoms of the first film,
   an amount β of Mn—F on the surface of the positive electrode active material particle measured by TOF-SIMS satisfies $8.2 \leq \alpha \leq 8.7$, and the amount β of Mn—F is calculated from the expression: {(Secondary Ion Intensity of $MnF_2$ Component)/(Total Detection Intensity of All Secondary Ions Having Mass Number (m/z) of 110 or Less)}×100(%).

8. The method of manufacturing a lithium ion secondary battery according to claim 7, wherein
forming the first film includes exposing the positive electrode active material particle to an atmosphere containing at least one of fluorine gas and nitrogen trifluoride gas to form the first film.

9. The method of manufacturing a lithium ion secondary battery according to claim 7,
wherein a ratio Da/Db satisfies 1.1≤Da/Db≤1.2 where Da represents an amount of lithium in the lithium nickel manganese composite oxide, and Db represents an amount of a nickel manganese composite oxide portion excluding lithium in the lithium nickel manganese composite oxide.

\* \* \* \* \*